United States Patent [19]

Smith

[11] Patent Number: 5,021,967

[45] Date of Patent: Jun. 4, 1991

[54] APPARATUS FOR DISPENSING MONEY ORDERS

[75] Inventor: Lawrence G. Smith, Orlando, Fla.

[73] Assignee: Republic Money Orders, Inc., Dallas, Tex.

[21] Appl. No.: 494,562

[22] Filed: Mar. 16, 1990

Related U.S. Application Data

[60] Continuation of Ser. No. 406,979, Sep. 13, 1989, which is a continuation of Ser. No. 121,074, Nov. 16, 1987, Pat. No. 4,870,592, which is a continuation of Ser. No. 60,762, Jun. 8, 1987, Pat. No. 4,812,986, which is a division of Ser. No. 877,539, Oct. 31, 1986, Pat. No. 4,699,532, which is a division of Ser. No. 596,291, Apr. 3, 1984, Pat. No. 4,625,275.

[51] Int. Cl.$^5$ ............................................. G06F 15/30
[52] U.S. Cl. .................................... 364/479; 235/379; 364/405; 902/1
[58] Field of Search ............... 364/400, 401, 406, 408, 364/478, 479, 519, 405; 235/375, 379–382.5, 432, 433, 431; 400/121, 124, 104–106, 50, 103; 902/1, 2

[56] References Cited

U.S. PATENT DOCUMENTS

| | | | |
|---|---|---|---|
| 2,071,141 | 2/1937 | Placke | 235/3 |
| 3,814,227 | 6/1974 | Hurd, III et al. | 400/121 |
| 3,848,798 | 11/1974 | Riley | 235/101 |
| 3,970,992 | 7/1976 | Boothroyd et al. | 364/900 |
| 3,984,660 | 10/1976 | Oka et al. | 235/381 |
| 3,997,763 | 12/1976 | Schasser | 235/432 |
| 4,025,905 | 5/1977 | Gorgens | 364/900 |
| 4,035,792 | 7/1977 | Price et al. | 354/76 |
| 4,053,735 | 10/1977 | Foudos | 235/419 |
| 4,082,945 | 4/1978 | van de Goor et al. | 235/419 |
| 4,175,694 | 11/1979 | Donabin | 235/475 |
| 4,225,779 | 9/1980 | Sano et al. | 235/379 |
| 4,266,121 | 5/1981 | Hirose | 235/381 |
| 4,270,042 | 5/1981 | Case | 235/379 |
| 4,317,028 | 2/1982 | Simjian | 235/380 |
| 4,321,671 | 3/1982 | Ohsako | 364/405 |
| 4,341,951 | 7/1982 | Benton | 235/379 |
| 4,355,369 | 10/1982 | Garvin | 364/900 |
| 4,385,285 | 5/1983 | Horst et al. | 382/3 |
| 4,417,137 | 11/1983 | Lundblad | 235/379 |
| 4,611,286 | 9/1986 | Nishimura et al. | 364/405 |
| 4,625,275 | 11/1986 | Smith | 364/401 |
| 4,699,532 | 10/1987 | Smith | 400/104 |
| 4,812,986 | 3/1989 | Smith | 364/479 |
| 4,870,596 | 9/1989 | Smith | 364/479 |
| 4,894,784 | 1/1990 | Smith | 364/479 |

Primary Examiner—Joseph Ruggiero
Attorney, Agent, or Firm—Michael A. O'Neil

[57] ABSTRACT

An apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-eraseable programmable read only memory (E$^2$PROM) for storing a security inhibit printing code, this code being automatically changed to prevent actuation of the printer when the security of the dispenser is compromised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

1 Claim, 3 Drawing Sheets

APPARATUS FOR DISPENSING MONEY ORDERS

This is a continuation of application Ser. No. 07/406,979, filed Sept. 13, 1989, which is a continuation of application Ser. No. 07/121,074, filed Nov. 16, 1987, U.S. Pat. No. 4,870,592, which is a continuation of application Ser. No. 07/060,762, filed Jun. 8, 1987, U.S. Pat. No. 4,812,986, which is a division of application Ser. No. 06/877,539, filed on Oct. 31, 1986, now U.S. Pat. No. 4,699,532, which is a division of application Ser. No. 05/596,291, filed Apr. 3, 1984, now U.S. Pat. No. 4,625,275.

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vendor portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser combersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overall operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programmable read only memory ($E^2PROM$). This $E^2PROM$ stores a security inhibit printing code which must be "recognized" by a printer software routine to enable the dot matrix printer. Each dispenser further stores a control software routine which operates to change or erase the security inhibit printing code stored in the $E^2PROM$ when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order in a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the $E^2PROM$ associated with each processor.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
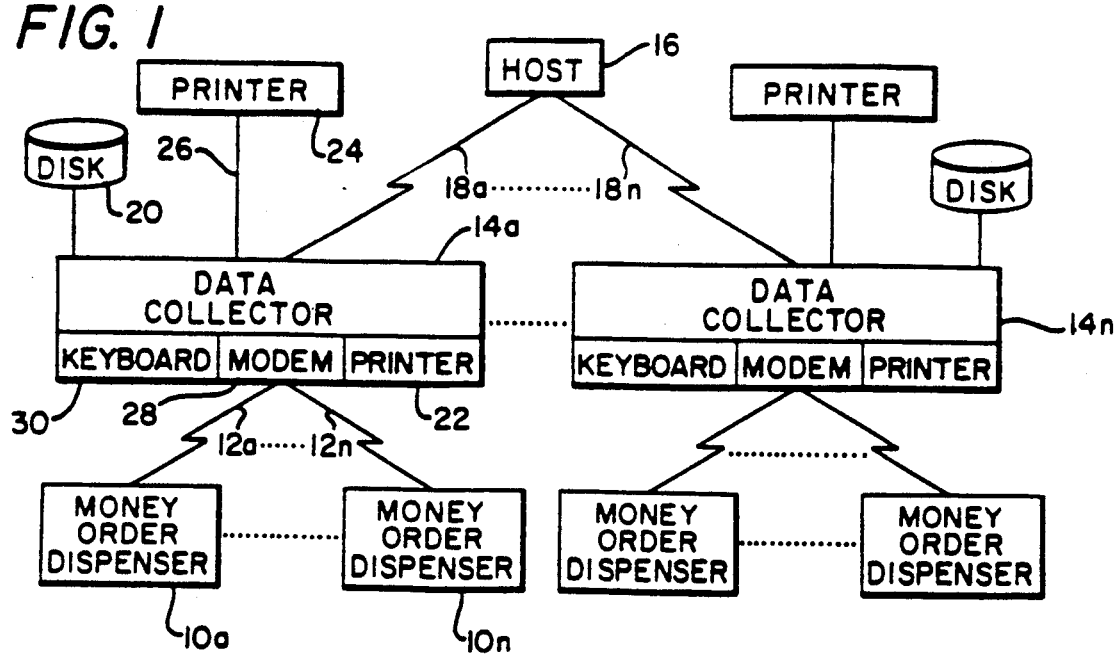
FIG. 1 is a block diagram of a desired system configuration incorporating a plurality of money order dispensers connected to one or more data collector devices, which are in turn connected to a host device.

With reference now to the FIGURES wherein like reference characters designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a-10n on a time-shared basis. In the preferred embodiment, a plurality of data collectors 14a-14n are connected to a host device 16 through communications links 18a-18n. Each communications link 18 is either a modem link or an RS232 serial full-duplex interface for direct connection to the host device 16. Alternately, the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a-10n. Data collector 14a also includes an internal printer 22 for printing this transaction information, although alternately, an external printer 24 is used for this purpose through an RS232 serial link 26. An internal modem 28 is also provided for direct communications to the money order dispensers 10a-10n over the communications links 12a-12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator sets limits on the following variables listed in TABLE I:

TABLE I

| VARIABLE NAME | DEFINITION |
| --- | --- |
| [-MCH MO# XXXXX-] | Total number of money orders to be printed before dispenser must be reauthorized |
| [-MCH MO# XXXXXXX-] | Maximum money order dollar amount to be issued before dispenser must be reauthorized |
| [-CST MO$ XXXXX.XX-] | Maximum dollar value per money order per customer |
| [-MCH CK# XXXXX-] | Maximum number of vendor payments which may be printed before dispenser must be reauthorized |
| [-MCH CK# XXXXX.XX-] | Maximum vendor payment dollar amount which can be issued before dispenser must be reauthorized |
| [-CST MO# XXXX-] | Maximum number of money orders which can be printed per customer |
| [-VND CK# XXXX-] | Maximum number of vendor payments which can be printed per vendor |
| [-VND CK# XXXXX.XX-] | Maximum dollar amount per vendor payment |
| [-WARN-#BLANKS XX-] | Number of blank money orders left in dispenser when warning |

TABLE I-continued

| VARIABLE NAME | DEFINITION |
| --- | --- |
| | issued |
| [-WARN-#TRANS XX-] | Amount of transaction storage left in dispenser memory when warning is issued |
| [-LOCK # ERRORS XX-] | Number of errors allowed before dispenser locks. |

As used throughout the remainder of the specification, the above limits and codes are referred to as "control" data. This control data is transmitted to the various money order devices 10a-10n located at the plurality of retail establishments.

Preferably, each of the other data collectors 14 shown in FIG. 1 include the same type of peripheral devices associated with the data collector 14a. The data collectors 14a-14n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invention is capable of fully independent stand-alone operation, as well as a direct on-line connection to a point-of-sale system.

Figure 2:
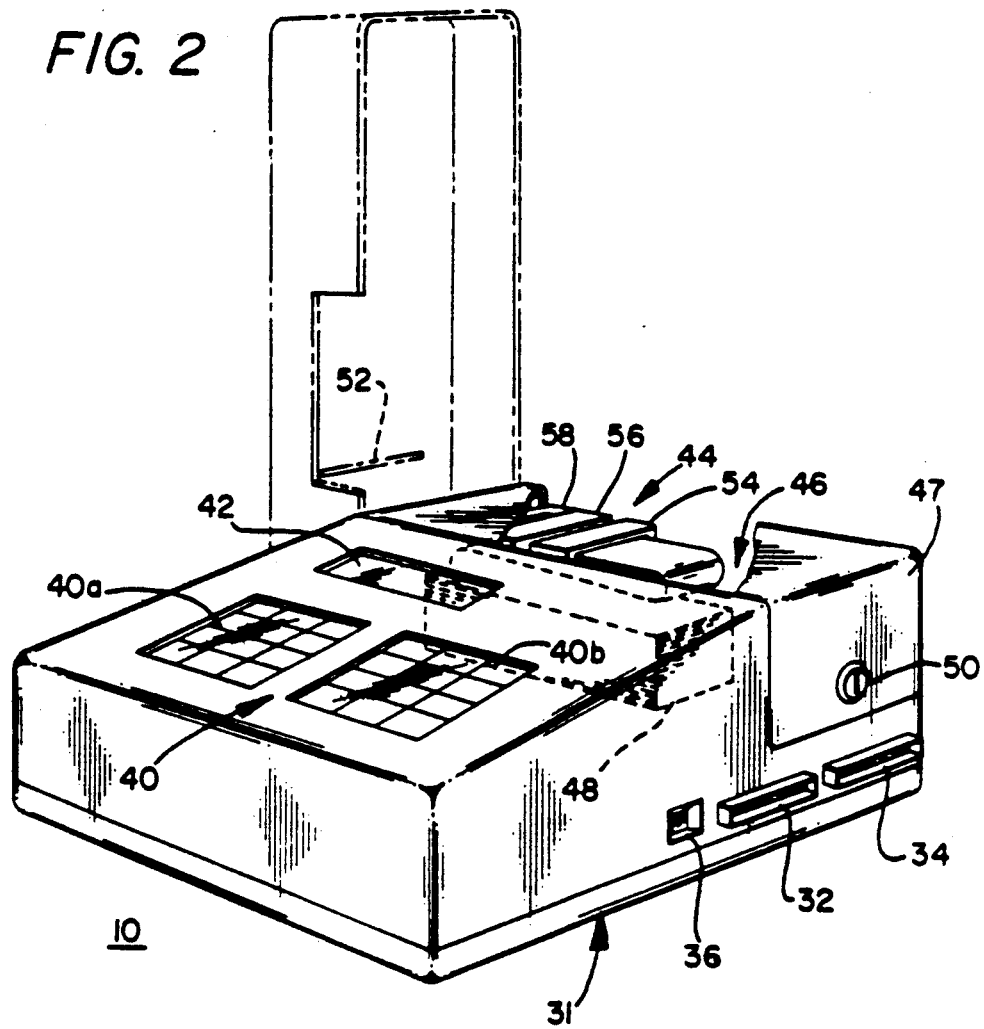
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retail establishment by appropriate securing means. The dispenser 10 is designed to be operable from 115 volts a.c. power, or d.c. power from an appropriate point-of-sale system. The power options are selectable by an internal selection switch (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen in FIG. 2, the storage compartment cover 47 includes an output throat 52 through which the printed money orders are dispensed. To effect printing of a money order, the dot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means is required since normal printing of the indicia would render the money order unreadable due to the transverse feed. Accordingly, a printer software routine to be described is provided for controlling the printer to produce readable alphanumeric indicia on the printed money orders.

Figures 3, 4:
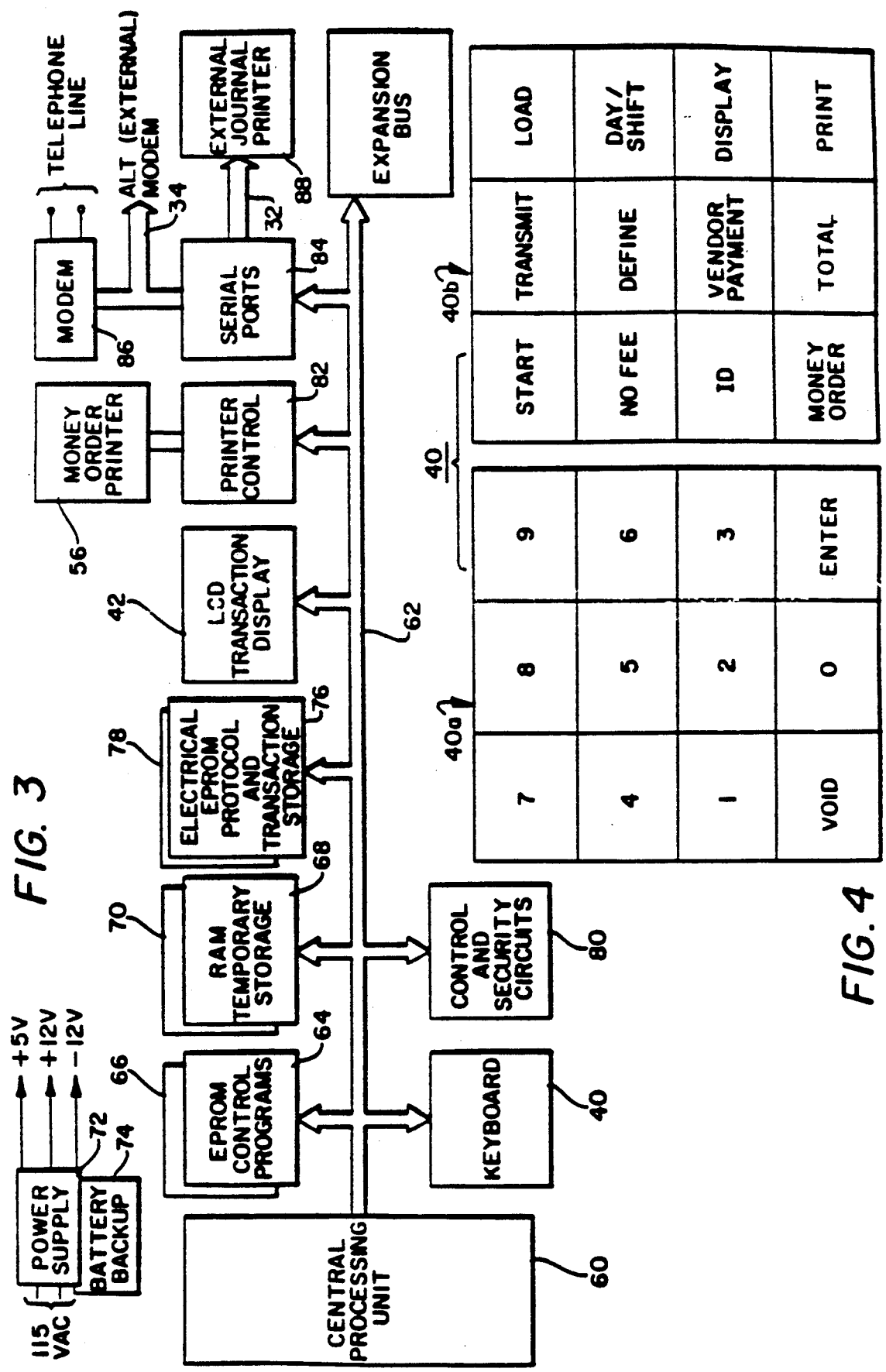
FIG. 3 is a block diagram of the electronic hardware incorporated in the money order dispenser of FIG. 2.
FIG. 4 is a representation of the preferred embodiment of the keyboard used in the money order dispenser of FIG. 2.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM'S 64 and 66 are connected to the CPU 60 by the bus 62. As also seen in FIG. 3, the money order dispenser 10 includes random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power be suddenly interrupted to the dispenser 10.

The money order dispenser 10 further includes a pair of electrically-eraseable programmable read only memories ($E^2$PROM's) or equivalent semi-permanent memory device such as a battery supported RAM, 76 and 78 connected to the CPU 60 by the bus 62. The $E^2$PROM 76 is provided for storing various communication protocols utilized by the money order dispenser. In particular, the $E^2$PROM 76 supports the NCR foreign attachment protocol, MSI special protocol, SDLC protocol and IBM 3680 store system interface. Additional protocols may be down-loaded into the $E^2$PROM 76 by the data collector as required. Data and control codes for the above protocols are well known in the prior art and a description thereof is unnecessary for a complete understanding of the present invention.

According to a feature of the present invention, the $E^2$PROM 78 is provided to store the transaction data for between 500-2000 vendor/customer transactions. Moreover, the $E^2$PROM 78 also stores a security inhibit printing code for the money order dispenser 10 for security purposes. The printer software routine for controlling the dot matrix printer 56 must "recognize" the security inhibit printing code resident in $E^2$PROM 78 in order to operate the dot matrix printer 56. If the security of the money order dispenser is compromised in any way, a control software routine stored in EPROM 64 operates to change or erase the security inhibit printing code stored in the $E^2$PROM 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromised" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, if a previously determined amount or number of money orders, or other system operator-imposed constraints, have been exceeded, or if no recent communications have taken place within authorized time limits.

A control and security circuit 80 is also provided and includes an internal clock for controlling the timing of the various circuits shown in FIG. 3, and also for defining the date and time information for the transaction data. As discussed above, the LCD display 42 is provided for displaying this transaction data as well as system messages. The display software stored in EPROM 66 also disables the display if the dispenser is not in use for a period of time, and controls the display to indicate when the $E^2$PROM 78 is approximately filled with transaction data. The money order dispenser 10 will discontinue further issuance of money orders and notify the operator if the $E^2$PROM 78 is full. According to the present invention, the transaction data is then transmitted to the respective data collector device of FIG. 1 before the money order dispenser 10 may again issue money orders. The use of the non-volatile reusable E²PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software routine. The money order dispenser 10 further includes serial ports 84, connected to the CPU 60 by the bus 62, for driving an internal modem 86, and the external journal printer 88 via an RS232 duplex link. As noted above, when the internal modem 86 is not used, the modem interface is brought to the RS232 connector jack 34 for an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"–"9" for entering control and transaction data, and a "VOID" and "ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys of the second section 40b. The following message is then displayed on the display 42:

[-SECURITY#_-]

The security number is a five digit number and is not displayed. This number must be correctly entered by the vendor in order for the sequence to continue. After the security number has been entered and verified, a manual entry of a store identification number is required. Accordingly, the following store number message is displayed on the LCD display 42:

[-STXXXXXXXXXXXXXX-]

The store number may be 1–14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:

[-DATE XX/XX/XX-]

[-TIME XX:XX:XX-]

The Definition Mode sequence further continues with the following displays for entering of identification entries, money order fees, a phone number dialed automatically under certain conditions, and an "ID USE" code for money order and vendor payment transactions:

[-ID XXX-]

[-FEE XXX.XX, YY.YY-]

[-PHX-XXX-XXX-XXXX-]

[-ID USE X-]

Specifically, the system includes twenty money order fees where XXX.XX is the dollar breakpoint, and YY.YY is the fee charged for any money order greater than the previous money order and less than or equal to the present XXX.XX breakpoint. The "ID USE" code takes on the following possible values:

0—No ID Number needs to be entered;
1—All ID Numbers are entered at the start of the day only;
2—A valid ID Number must be entered for each transaction.

Entering of the above code information at the money order dispenser, as well as the information in TABLE I at the data collector, constitutes the Definition Mode. Once the last enter key has been pressed at the dispenser, the display screen 42 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be displayed:

[-ID         -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 40b is also depressed. Subsequently, a dollar amount for the money order is entered via the numeric keys of the first section 40a followed by depression of the "MONEY ORDER" key of section 40b. The "TOTAL" key of section 40b is then depressed if more than one money order is required to be printed. The fee for each money order is automatically added to the total. Finally, the "PRINT" key of section 40b is then depressed and the requested money order is printed by the dot matrix printer 56 as discussed above with respect to FIG. 2. Note that if the "VOID" key of section 40a is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40b is depressed followed by the "TOTAL" and "PRINT" keys as discussed above with respect to the issuance of a money order.

Under a "Load Mode", money order forms are loaded into the money order dispenser 10. This is accomplished by opening the money order storage compartment cover 47, depressing the "START" key and then a "LOAD" key of section 40b. Depression of these keys will produce the following sequential display messages:

```
[-SECURITY #          -]
   [-BEG # XXXXXXXX-]
   [-END # XXXXXXXX-]
```

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40b. Upon depression of these keys, the following sequential display messages occur:

```
[-SECURITY #          -]
   [-DIAL TELEPHONE #-]
```

After entering of the security number and dialing the telephone number for connection to the appropriate data collector, the operator places the phone receiver in the modem. The "START" key is then depressed to cause the dispenser to transmit the stored transaction data in E²PROM 78 to the data collector. After transmission the following message is displayed to prompt the operator to disconnect the dispenser from the modem:
```
[-DISCONNECT RMOD-]
```

This constitutes the Transmission Mode. Once the last data is transmitted and a verification signal is received by the money order dispenser, the dispenser automatically terminates the connection, displays the above disconnect message and exits the Transmission Mode.

As discussed above, an important feature of the present invention is the use of the dot matrix printer 56 which is designed to receive a money order in a transverse direction with respect to the printing of normal indicia thereon. The movement of money orders through the dot matrix printer in a transverse fashion facilities the use of a small dot matrix printer, thereby reducing the overall dimensions of the money order dispenser of the present invention. However, since the money order is passed through the dot matrix printer in a transverse fashion, normal printing of indicia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Figure 5:
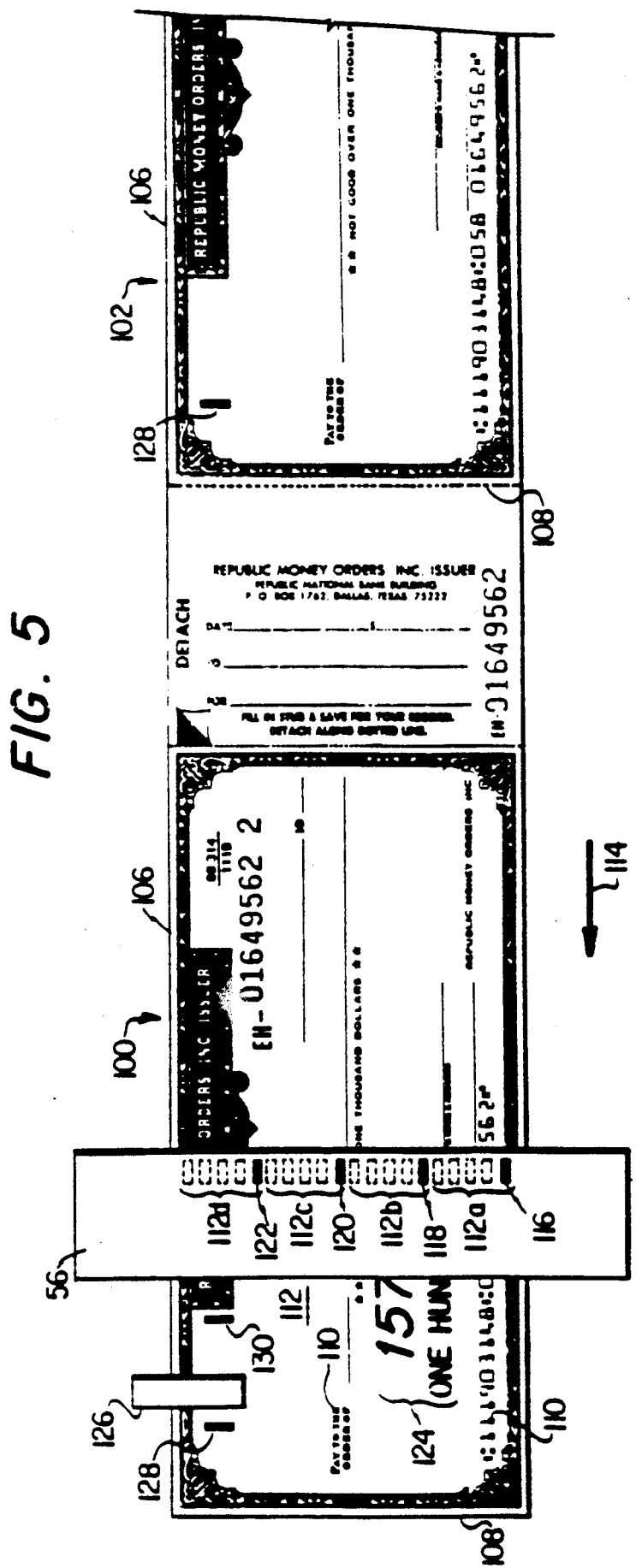
FIG. 5 is a top view of the dot matrix printer incorporated in the dispenser of FIG. 2 detailing the movement of a money order therethrough.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example elements 116, 118, 120 and 122, each of which reciprocate transversely to print alphanumeric indicia in four regions of the printing zone 112. Specifically, print element 116 moves transversely through the region 112a of the printing zone 112, print element 118 moves transversely through the printing zone 112b, etc.

Therefore, as seen in FIG. 5, the dot matrix printer 56 extends transversely across the printing zone 112 for printing variable alphanumeric indicia on the money order forms. It should be appreciated, however, that since the dot matrix printer normally prints indicia in a transverse direction, normal operation of the printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of the printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth below:

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

I claim:

1. A system for issuing negotiable instruments to a purchaser comprising:

a point-of-sale negotiable instrument dispenser for issuing negotiable instruments at a predetermined location at the request of the purchaser where purchases of items other than negotiable instruments may be made;

a digital processor associated with the dispenser and having a stored program for controlling the operation of the dispenser including the number of instruments issued in a given period of time and a predetermined total dollar value of the negotiable instruments;

a memory associated with the digital processor for storing the dispenser transaction data relating to negotiable instruments issued, for storing a security code that authorizes printing of the negotiable instruments, and for maintaining the program for controlling the digital processor;

a compartment in the dispenser for storing blank negotiable instrument forms;

a printer in the dispenser for receiving negotiable instrument forms from the compartment and printing alphanumeric indicia thereon upon command from the dispenser; and a cash register coupled to the dispenser at the point-of-sale and having a keyboard for transmitting a security code to the digital processor control program authorizing the printing of the negotiable instrument and for sending negotiable instrument transaction instructions to the dispenser for use by the digital processor control program to cause the printer to print a negotiable instrument as requested by the purchaser;

the cash register further comprising means for receiving stored transaction data from the dispenser.

* * * * *

UNITED STATES PATENT AND TRADEMARK OFFICE
CERTIFICATE OF CORRECTION

PATENT NO. : 5,021,967

DATED : June 4, 1991

INVENTOR(S) : Lawrence G. Smith

It is certified that error appears in the above-identified patent and that said Letters Patent is hereby corrected as shown below:

On the title page item [60] under "Related U.S. Application Data" change "Pat. No. 4,870,592" to read --Pat. No. 4,870,596--.

Column 11, after line 21, insert the following text, as shown on the attached pages.

Signed and Sealed this

Second Day of March, 1993

*Attest:*

STEPHEN G. KUNIN

*Attesting Officer*      *Acting Commissioner of Patents and Trademarks*

```
EEPROM DATA AREA
            PAGE
;EEPROM DATA LOCATED AT E000H-E3FFH
EPRM    SEGMENT AT 0E000H
;DOWN LOADED STORE INFORMATION
SCRTY   DB      ?               :SECURITY NUMBER
STACC   DB      ?               :STORE # MAJOR ACCOUNT
STSTE   DB      ?               :STORE # STATE
STSUB   DB      ?               :STORE # SUB ACCOUNT
STDIV   DB      ?               :STORE # DIVISION
STSTR   DB      ?.              :STORE # STORE
MONTH   DB      ?               :DATE MONTH
DAY     DB      ?               :DATE DAY
YEAR    DB      ?               :DATE YEAR
PHONE   DB      11 DUP(?)       :TELEPHONE NUMBER

USE     DB      ?               :ID USE CODE 0 NO 1 .EEDS TO
                                 BE ENTERED
                                :1=ONE ID PER SHIFT/DAY
                                :2=ID FOR EVERY TRANSACTION
ID      DB      NID DUP(?)      :IDENTIFICATION NUMBERS

;RMOD STATUS INDICATORS - 0/1
RMODS   DB      ?               :RMOD STATUS - CLOSED/OPEN
MODMS   DB      ?               :MODEM STATUS - DISCNCT/DNCT
CRPPS   DB      ?               :MC PRINTER STATUS -
                                 OK/DISABLED
JRRRS   DB      ?               :JR PRINTER STATUS - OK
                                 DISABLED

BO Assembles 03-06-84            PAGE 1-2

EEPROM DATA AREA

KEYBS   DB      ?               :KEYBOARD STATUS - OK/LOCKED

;DATA DETERMINED AT RUN TIME-STORED HERE TO PRESERVE WHEN POWER
OFF
LOCKC   DB      ?               :ERROR COUNT BEFORE LOCKUP
TRPTR   DB      ?               :TRANSACTION POINTER
TXPTR   DB      ?               :TRASMISSION POINTER
FIDT    DB      NID DUP (?)     :FEE TOTAL PER ID

MCNT    DW      ?               :MC NUMBER TOTAL
MAMT    DD      ?               :MC AMOUNT TOTAL
VCNT    DW      ?               :VP NUMBER TOTAL
VAMT    DD      ?               :VP AMOUNT TOTAL
FAMT    DD      ?               :FE AMOUNT TOTAL
VOID    DW      ?               :NUMBER OF VOIDS
TCNT    DW      ?               :TOTAL TRANSACTIONS
TAMT    DD      ?               :TOTAL AMOUNT

;TRANSACTION BUFFER-FILLS UP REST OF EEPROM-ROTATING BUFFER
TRBFRS  DB      ?               :START OF TRANSACTION BUFFER
TRBFRE  DB      ?               :END OF TRANSACTION BUFFER
EPRM    ENDS

;EEPROM DATA LOCATED E4000H-E5FFFH
;DOWN LOADED PROTOCOL INFORMATION
EPRM    SEGMENT AT 0E400H
;SSSNO DATA DEFINEDSSS
EPRM    ENDS
SUBTTL  START OF PROGRAM - POWER OF SELF TEST AND
        INITIALIZATION AT FE00H
```

```
START OF PROGRAM
        PAGE
CODE    SEGMENT OF AFE00H
START:  CLI                      ;DISABLE INTERRUPTS
                                 ;TEST FLAGS, REGISTERS,
                                 ;   CONDITIONAL JUMPS
        MOV     AX,0D5H          ;SET FLAGS-SF,ZF,AF,PF,CF
        SAHF
        JNS     STERR
        JNZ     STERR
        JNP     STERR
        JNC     STERR
        LAHF
        MOV     CL,5             ;SET CARRY
        SHR     AH,CL
        JNC     STERR
        MOV     AL,40H           ;SET OVERFLOW
        SHL     AL,1
        JNO     STERR
        XOR     AX,AX            ;CLEAR FLAGS
        SAHF
        JS      STERR
        JZ      STERR
        JP      STERR
        JC      STERR
        LAHF
        MOV     CL,5             ;RESET CARRY
        SHR     AH,CL
        JC      STERR
        SHL     AH,1             ;RESET OVERFLOW
        JO      STERR
                                 ;TEST REGISTERS WITH ALL ONE'S
                                 ;    AND ZERO'S
        MOV     AX,0FFFFH
        STC                      ;SET CARRY - LOOP CONTROL
STRT1:  MOV     DX,AX            ;LOOP TO WRITE PATTERN TO ALL
                                 ;    REGISTERS
        MOV     BX,DS
        MOV     ES,BX
        MOV     CX,ES
        MOV     SS,CX
        MOV     DX,SS
        MOV     SP,DX
        MOV     BP,SP
        MOV     SI,BP
        MOV     DI,SI
        JNC     STRT2
        XOR     AX,DI            ;END OF FIRST TIME THROUGH
        JNZ     STERR            ;PATTERN NOT ALL ONE'S
        CLC                      ;CLEAR CARRY
        JNC     STRT1            ;REPEAT WITH ALL ZERO'S
STERR:  HLT                      ;POWER ON SELF TEST ERROR
STRT2:  OR      AX,DI            ;END OF SECOND TIME THROUGH
        JNZ     STERR            ;PATTERN NOT ALL ZERO'S
                                 ;TEST RAM WITH FF,AA,55,01,00
                                 ;    PATTERNS
        SUB     AX,AX            ;INITIALIZE ES & DS
        MOV     ES,AX
        MOV     DS,AX
        SUB     DI,DI
        MOV     BX,LMCSD         ;COMPUTE UPPER LIMIT OF RAM
        MOV     CL,4
        SHL     BX,CL            ;CANNOT BE > 0FFFFH
        OR      BX,002EH         ;RAM COUNT
        MOV     AX,0FFFFH
        MOVE    DX,55AAH
        CT.                      ;INCREMENT FLAG
        P.      CX,BX            ;COUNT
        R.Y     STOSB            ;FILL RAM WITH F.4ST PATTERN
STRT3:  DEC     DI               ;POINT TO LAST BYTE
        STD                      ;DECREMENT FLAG
STRT4:  MOV     SI,DI
        MOV     CX,BX
STRT5:  LODSB                    ;READ PATTERN STORED
        XOR     AL,AH            ;TEST IF OK
        JNE     STERR            ;TEST NOT OK
        CMP     AH,0
        JE      STRT6            ;ZERO PATTERN
        MOV     AL,DL
        STOSB                    ;WRITE NEXT PATTERN
STRT6:  LOOP    STRT5            ;CONTINUE UNTIL ALL OF RAM TEST
        CMP     AH,0
        JE      STRT7            ;RAM TEST COMPLETE
        MOV     AH,AL            ;ROTATE PATTERN
```

```
            XCHG    DH,DL
            CLD                     ;INCREMENT FLAG
            INC     DI              ;POINT TO START BYTE
            JZ      STRT4           ;READ/WRITE FORWARD
            DEC     DI              ;READ/WRITE BACKWARD
            MOV     DX,1            ;00 AND 01 PATTERN
            JMP     STRT3
                                    ;INITIALIZE SEGMENT REGISTER & STACK
STRT7       MOV     AX,DATA
            MOV     DS,AX
            MOVE    AX,EPRM
            MOV     ES,AX
            MOVE    AX,STACK
            MOV     SS,AX
            MOV     SP,OFFSET STACKT
                                    ;INITIALIZE THE CHIP SELECT
                                    ;CONTROLLER
            MOV     DX,LMCSR        ;LOWER MEMORY CHIP SELECT
            MOVE    AX,LMCSD        ;16K at 0 - 3FFFH
            OUT     DX,AX
            MOV     DX,PACSR        ;PERIPHERAL CHIP SELECT
            MOV     AX,PACSD
            OUT     DX,AX
            MOV     DX,MMCSR        ;MID-RANGE MEMORY CHIP SELECT
            MOV     AX,MMCSD        ;16K AT E0000H
            OUT     DX,AX
            MOV     DX,MPCSR        ;MID-RANGE MEMORY SIZE
            MOV     AX,MPCSD
            OUT     DX,AX
                                    ;INITIALIZE 8155 - A
            MOV     DX,A8155CS      ;CONTROLS CLOCK, KEYBOARD, DISPLAY
            MOV     AL,A8155CD      ;PORT A,B,C OUTPUTS, NO TIMER
            OUT     DX,AL
            INC.    DX              ;PORT A ADDRESS
            MOV     AL,A8155DA      ;ALL OUTPUTS HIGH
            OUT     DX,AL
            INC     DX              ;PORT B ADDRESS
            OUT     DX,AL
            INC     DX              ;PORT C ADDRESS
            OUT     DX,AL
            INC     DX              ;TIMER LOW COUNT ADDRESS
            MOV     AL,A8155TD      ;NO TIME
            OUT     DX,AL
            INC     DX              ;TIMER HIGH COUNT ADDRESS
                                    ;INITIALIZE 8155 - B
            MOV     DX,B8155CS      ;MONITORS DIP SWITCHES
            MOV     AL,B8155CD      ;PORT A INPUTS, B&C OUTOUTS, NO TIMER
            OUT     DX,AL
            INC     DX              ;PORT A ADDRESS
            MOV     AL,B8155DA      ;ALL INPUTS HIGH
            OUT     DX,AL
            INC     DX              ;PORT B ADDRESS
            OUT     DX,AL           ;ALL OUTPUTS HIGH
            INC     DX              ;PORT C ADDRESS
            OUT     DX,AL
            INC     DX              ;TIMER LOW COUNT ADDRESS
            MOV     AL,B8155TD      ;NO TIME
            OUT     DX,AL
            INC     DX              ;TIMER HIGH COUNT ADDRESS
            OUT     DX,AL
;$$$NO PROGRAM YET$$$                ;INITIALIZE THE DMA CONTROLLER
;$$$NO PROGRAM YET$$$                ;INITIALIZE THE TIME CONTROLLER
;$$$NO PROGRAM YET$$$                ;INITIALIZE THE INTERRUPT CONTROLLER
            CALL    CLKINT          ;INITIALIZE CLOCK
            CALL    DSPINT          ;INITIALIZE DISPLAY
            CALL    JPRTINT         ;INITIALIZE JOURNAL PRINTER
            CALL    CPRTINT         ;INITIALIZE CHECK PRINTER
                                    ;SET UP INTERRUPT VECTOR TABLE
            MOV     ES:NMIPTR,OFFSET NMI
            MOV     ES:NMIPTR+2, CODE
            MOV     ES:THROPTR,OFFSET THRO
            MOV     ES:THROPTR+2, CODE
            MOV     ES:DMAOPTR, OFFSET DMA0
            MOV     ES:DMAOPTR+2,CODE
            MOV     ES:DMA1PTR,OFFSET DMA1
            MOV     ES:DMA1PTR+2,CODE
            MOV     ES:INTOPTR,OFFSET INTO
            MOV     ES:INTOPTR+2,CODE
            MOV     ES:CLCKPTR,OFFSET CLCK
            MOV     ES:CLCKPTR+2,CODE
            MOVE    ES:INT2PTR,FFSET INT2
            MOV     ES:INT2PTR+2,CODE
            MOV     ES:INT3PTR,OFFSET INT0
            MOV     ES:INT3PTR+2,CODE
            MOV     ES:TMR1PTR,OFFSET TMR1
            MOV     ES:TMR1PTR+2,CODE
```

```
            MOV     ES:TMR2PTR,OFFSET TMR2
            MOV     ES:TMR2PTR+2,CODE
            CALL    DSPCLR          ;CLEAR DISPLAY
            CLD                     ;FILL KEYBOARD BUFFER WITH SPACES
            MOV     DI,OFFSET KBFR
            MOVE    CX,SKBFR
            MOV     AL,20H
    REP     STOSB
            STI                     ;ENABLE INTERRUPTS
    STRT3:  CALL    RMDCK           ;CHECK RMOD
            CALL    KEYB            ;SCAN KEYBOARD
            CALL    PWRCK           ;CHECK FOR POWER DOWN
            JMP     STRT3           ;LOOP FOREVER
    CODE    ENDS

;POWER ON RESET VECTOR - LOCATED AT 0FFFF0H
RESET   SEGMENT AT 0FFFFH

START OF PROGRAM
            MOV     DX,UMCSR        ;UPPER MEMORY CHIP SELECT
            MOV     AX,UMCSD        ;8K AT FE000H
            OUT     DX,AX
            JMP     FAR PTR START
            DB      'RMOO'
RESET   ENDS
        END

CRO Assembler 03-05-84  Page 1-3

INT VECTOR 2 - NON MASKABLE INTERRUPT - RMOD INTERLOCK

Page
    ;NMI    PROCEDURE-REENTRANT, NONMASKABLE INTERRUPT
    ;           ENTRY-INTERRUPT 2
    ;           EXIT-RMODS=1 - OPEN
            PUBLIC  NMI
    NMI     PROC    NEAR
            PUSH    BP
            MOV     BP,SP           ;ESTABLISH BASE POINTER
            PUSH    BX
            PUSH    AX
            PUSHF
            MOV     BX,OFFSET RMODS ;WRITE RMOD OPEN
                                            INDICATOR
            MOV     AL,01H
            CALL    WEEPRM          ;WRITE TO EEPROM ONE
                                            BYTE
            POPF
            POP     AX
            POP     BX
            POP     BP
            IRET
    NMI     ENDP
    SUBTTL                  INTO - INTERRUPT 0

CRO Assembler 03-05-84
STERS
            TITLE   RMDCK - CHECK RMOD STATUS REGIS
            STERS
                    PAGE            66,132
            CGROUP  GROUP           CODE, CONST, RESET
            CGROUP  GROUP           INTV, STACK,DATA
            EGROUP  GROUP           PRM EPRM    SEGMENT         PUBLIC EPRM
                    EXTRN           RMODS:BYTE, CKPRS:BYTE
                    EXTRN           JRPRS:BYTE, KEYBS:BYTE, LCCKC:BYTE
                    EXTRN           LOCK:BYTE
            EPRM    ENDS CODE    SEGMENT PUBLIC CODE
                    ASSUME  CS:CGROUP, DS:DGROUP, SS:DGROUP,ES:EGROUP
                    EXTRN           WEEPRM:NEAR ;RMDCK PROCEDURE - CHECK ALL VITAL RMOD STATUS REGISTERS
    ;       IF RMOD WAS OPENED                          - RMODS=1 OR
    ;       IF ERROR COUNT EQUALS MAXIMUM               - LOCKC=LOCK
    ;       THEN MONEY ORDER PRINTER IS DISABLED        - CKPRS=LAND
```

```
;               JOURNAL PRINTER IS DISABLED        - JRPRS=1,AND
;               KEYBOARD IS LOCKED                 - KEYBS=1
        PUBLIC  RMDCK
RMDCK   PROC            NEAR
        XOR             AL,AL
        TEST            RMODS,01H       ;TEST RMOD FOR OPEN
        JNZ             RMDCK1          ;OPEN
        MOV             AH,LOCKC        ;ERROR COUNT
        CMP             AH,LOCK         ;MAXIMUM ERROR COUNT
        JB              RMDCK2          ;MAXIMUM ERROR COUNT
                                         NOT REACHED
RMDCK1: INC     AL
RMDCK2: MOV     BX,OFFSET CKPRS ;MONEY ORDER PRINTER-
                                 0=ENABLE,1=DISABLE
        CALL    WEEPRM
        INC     BX      ;JOURNAL PRINTER - 0=ENABLE,1=DISABLE
        CALL    WEEPRM
        INC     BX      ;KEYBOARD        - 0=ENABLE,1=LOCKED
        CALL    WEEPRM
        RET
RMDCK   ENDP
CODE    ENDS
        END
```

```
        TITLE           KEYB - KEYBOARD MODULE
                Page    66.132

DATA    SEGMENT PUBLIC 'DATA'
        EXTRN   MOVP:BYTE  TOTS:BYTE  DSPR:BYTE  SHFT:BYTE  FEEC:BYTE
        EXTRN   KEY:BYTE   KEYP:BYTE  KEYT:BYTE  KEYD:BYTE
        EXTRN   KNDG:BYTE  KCMD:BYTE  KPCMD:BYTE
        EXTRN   KENTM:BYTE KENTP:WORD
        EXTRN   KNBR:BYTE  KFLD:BYTE  KLCK:BYTE
        EXTRN   KDSP:BYTE  KCNT:BYTE  KTPE:BYTE
        EXTRN   KLLMT:DWORD           KULMT:DWORD
        EXTRN   KPTR:DWORD KBIN:DWORD KBPTR:DWORD

EXTRN   CHR:BYTE   CMIN:BYTE  CSEC:BYTE
        EXTRN   CSCRTY:WORD
        EXTRN   CSACC:DWORD           CSNBR:DWORD CSCHK:BYTE
        EXTRN   CID:BYTE   CIDL:BYTE
        EXTRN   CCNT:WORD  CAMT:DWORD DFEE:DWORD  CTOT:DWORD
        EXTRN   DPIDT:DWORD
        EXTRN   CMCNT:WORD CMAMT:DWORD
        EXTRN   CVCNT:WORD CVAMT:DWORD
        EXTRN   CTCNT:WORD CTAMT:DWORD
        EXTRN   KBFR:BYTE  DBFR:BYTE  SCRTCH:BYTE
DATA    ENDS

EPRM    SEGMENT PUBLIC 'EPRM'
        EXTRN   SCRTY:WORD
        EXTRN   STACC:WORD STSTE:BYTE STSUB:BYTE STDIV:WORD STSTR:WORD
        EXTRN   MONTH:BYTE DATE:BYTE  YEAR:BYTE
        EXTRN   PHONE:BYTE
        EXTRN   USE:BYTE              ID:BYTE
        EXTRN   FEELMT:DWORD          FEEAMT:DWORD
        EXTRN   MCNTC:WORD            MCNTM:WORD
        EXTRN   MAMTC:DWORD           MAMTM:DWORD
        EXTRN   VCNTC:WORD            VCNTM:WORD
        EXTRN   VAMTC:DWORD           VAMTM:DWORD
        EXTRN   BLANKS:BYTE           TRANS:BYTE  LOOK:BYTE
        EXTRN   BSACC1:WORD BSNBR1:DWORD  BSCHK1:BYTE
        EXTRN   ESACC1:WORD ESNBR1:DWORD  ESCHK1:BYTE
        EXTRN   BSACC2:WORD BSNBR2:DWORD  BSCHK2:BYTE
        EXTRN   ESACC2:WORD ESNBR2:DWORD  ESCHK2:BYTE
        EXTRN   RMODS:BYTE  MODMS:BYTE    CKPRS:BYTE
        EXTRN   JRPRS:BYTE  KEYBS:BYTE    LOCKS:BYTE
EPRM    ENDS

CODE    SEGMENT PUBLIC 'CODE'
        EXTRN   PWRON:NEAR
        EXTRN   WEEPRM:NEAR
        EXTRN   TRNS:NEAR
        EXTRN   DISP:NEAR  JPRT:NEAR  CPRT:NEAR
        EXTRN   ASCBN:NEAR BNASC:NEAR
        EXTRN   DPCMP:NEAR DPADD:NEAR DPSUB:NEAR  DPMUL:NEAR  DPDIV:NEAR
CODE    ENDS

DGROUP  GROUP   CODE, CONST, RESET
DGROUP  GROUP   INIV, STACK DATA
```

```
CODE SEGMENT PUBLIC 'CODE'

RO Assembler 03-06-84

ASSUME CS:CGROUP, DS:GROUP, SS:DGROUP, ES:EGROUP

;KEYBOARD CONSTANTS

NID      EQU   20         ;NUMBER OF IDENTIFICATION CODES
NFEE     EQU   20         ;NUMBER OF FEES
NTR      EQU   16         ;NUMBER OF TRANSACTIONS PER
                          ; CUSTOMER/VENDOR
SKBFR    EQU   16         ;SIZE OF KEYBOARD BUFFER
SDBFR    EQU   16         ;SIZE OF DISPLAY BUFFER
KBDCS    EQU   300H       ;KEYBOARD COMMAND/STATUS ADDRESS
KBDCD    EQU   00DH       ;PORT A & C OUTPUT, B INPUT
KBDRS    EQU   0FBH       ;ROW 1 SELECT
KBDRM    EQU   00FH       ;READ MASK
KNKEY    EQU   24         ;NUMBER OF KEYS
KNROW    EQU   6          ;NUMBER OR ROWS
KNCOL    EQU   4          ;NUMBER OF COLUMNS
KDBNC    EQU   4          ;DEBOUNCE CONSTANT
KBYTE    EQU   1          ;BYTE ENTRY
KWORD    EQU   2          ;WORD ENTRY
KDWRD    EQU   3          ;DWORD ENTRY
KREAL    EQU   4          ;REAL ENTRY
KALPHA   EQU   5          ;ALPHA ENTRY
KEY0     EQU   00H        ;0
KEY1     EQU   01H        ;1
KEY2     EQU   02H        ;2
KEY3     EQU   03H        ;3
KEY4     EQU   04H        ;4
KEY5     EQU   05H        ;5
KEY6     EQU   06H        ;6
KEY7     EQU   07H        ;7
KEY8     EQU   08H        ;8
KEY9     EQU   09H        ;9
KEYEN    EQU   0AH        ;ENTER
KEYVD    EQU   0BH        ;VOID
KEYST    EQU   0CH        ;START
KEYNF    EQU   0DH        ;NO FEE
KEYID    EQU   0EH        ;ID
KEYMO    EQU   0FH        ;MONEY ORDER
KEYTX    EQU   10H        ;TRANSMIT
KEYDF    EQU   11H        ;DEFINE
KEYVP    EQU   12H        ;VENDOR PAYMENT
KEYTO    EQU   13H        ;TOTAL
KEYLD    EQU   14H        ;LOAD
KEYDY    EQU   15H        ;DAY/SHIFT
KEYDS    EQU   16H        ;DISPLAY
KEYBR    EQU   17H        ;PRINT
KEYDATA  DB    KEYLD      ;KEY CODE TABLE
         DB    KEYDY
         DB    KEYDS
         DB    KEYPR
         DB    KEYTX
         DB    KEYDF
         DB    KEYBP
         DB    KEYTO
         DB    KEYST
         DB    KEYNF
         DB    KEYID
         DB    KEYMO
         DB    KEY6
         DB    KEY3
         DB    KEYEN

CRO Assembler 03-06-84

DB    KEY8
         DB    KEY5
         DB    KEY2
         DB    KEY0
         DB    KEY7
         DB    KEY4
         DB    KEY1
         DB    KEYVD
KEYJT    DW    KENT       ;KEYBOARD JUMP TABLE
         DW    KVOID
         DW    KSTRT
         DW    KNFEE
         DW    KID
         DW    KMO
         DW    KTRNS
```

```
                DW      KDEFN
                DW      KVP
                DW      KTOTL
                DW      KLOAD
                DW      KSHFT
                DW      KDISP
                DW      KPRNT
;DATA ENTRY AND DISPLAY TABLES
;NUMBER OF DATA ITEMS TO BE ENTERED
;16 CHARACTER DISPLAY
;NUMBER OF POSSIBLE ENTRIES PER DATA ITEM
;NUMBER OF FIELDS
;NUMBER OF ERRONEOUS ENTRIES BEFORE RMOD LOCKS
;DISPLAY START OF ENTRY - 0=NO DISPLAY
;NUMBER OF CHARACTERS PER DISPLAY - 0=NONE ALLOWED
;TYPE OF DATA - 1=BYTE, 2=WORD, 3=DWORD, 4=REAL, 5=ALPHA
;LOWER LIMIT - 0=NO LIMIT CHECK, FFFFFFFF=CHECK AGAINST ARRAY
            IN UPPER LIMIT
;UPPER LIMIT
;DATA STORAGE POINTER
KSTRTN    EQU     2                       ;START OF DAY KEYBOARD DATA
KSTRTD    DB      'ID            ',20,1,5

DB      14,3,1
          DD      0FFFFFFFFH,ID
          DD      CIDL
          DB      'BEG#          ',1,3,0

DB      6,3,2
          DD      0FFFFFFFFH,BSACC1
          DD      CSACC
          DB      9,6,3
          DD      0FFFFFFFFH,DBNBR1
          DD      CSNBR
          DB      16,12,1
          DD      0FFFFFFFFH,BSCHK1
          DD      CSCHK
          DD      0F      FH,SCRTY
          DD      CSCRTY'       DB
'DIAL TELELPHONE #',0,0,0

DB      0,0,0
          DD      0,0

DD      TRNS
          DB      'DISCONNECT RMOD ',0,0,0

DB      0,0,0
          DD      0,0

DD      0
KFMN      EQU     19                      ;DEFINE KEYBOARD DATA-ENTERED BY
                                          ; MANAGER
KFMD      DB      'SECURITY#     ',1,1,0

DB      0,5,2
          DD      0,0

DD      SCRTY
          DB      'ST            ',1,5,0

DB      3,3,2
          DD      0,0

DD      STACC
          DB      6,2,1
          DD      0,0

DD      STSTE
          DB      8,2,1
          DD      0,0

DD      STSUB
          DB      10,3,2
          DD      0,0

DD      STDIV
          DB      13,4,2
          DD      0,0

DD      STSTR
          DB      'DATE   /  /  ',1,3,0
          DD      MONTH
          DB      12,2,
          DD      1,31
```

```
DD      DAY
DB      15.2.1
DD      0.0

DD      YEAR
DB      'TIME        :   :  ',1,3,0

DB      9.2.1
DD      0.24

DD      CHR
DB      12.2.1
DD      0.59

DD      CMIN
DB      15.2.1
DD      0.59

DD      CSEC
DB      'PHNE         ',1,1,0

DB      6.11.5_
DD      0.0

DD      PHONE
DB      'ID USE       ',1,1,0

DB      16.1.1
DD      0.2

DD      USE
DB      'ID           ',20,1,0

DB      14.3.1
DD      0.255

DD      ID
DB      'TE           ',20.2.0

DB      2.3.4
DD      0.99999999

DD      FEELNT
DB      12.4.4
DB      12.5.2
DD      0.0

DD      MCNTC
DB      'MCH MOS      ',0,1,0

DB      12.5.2
DD      0.0

DD      MCNTM
DB      'CST MOS      ',0,1,0

DB      8.8.4
DD      0.0

DD      MAMTC
DB      'MCH MOS      ',0,1,0

DB      8.8.4
DD      0.0

DD      MAMTM
DB      'VND CK#      ',0,1,0

DB      12.5.2
DD      0.0

DD      VCNTC
DB      'MCH CK#      ',0,1,0

DB      12.5.2
DD      0.0
```

```
            DD      VCKTN
            DB      'VNO CKS        ',0,1,0

DB      8,8,4
            DD      0,0

DD      NANTC
            DB      'NCN CKS        ',0,1,0
            DD      VANT

RO Assembler 03-06-84

DB      'WARN # BLANKS  ',0,1,0

DB      15,2,1

DD      0,0
            DB      'WARN # TRANS   ',0,1,0

DB      15,2,1
            DD      0,0

DD      TRANS
            DB      'LOCK # ERRORS  ',0,1,0

DB      15,2,1
            DD      0,0

DD      LOCK
KLOADN      EQU     3
KLOADD      DB      'SECURITY #     ',1,1,5

DB      0,5,2
            DD      0FFFFFFFFH,SECRTY
            DD      CSCRTY
            DB      'BEG#           ',1,3,0

DB      6,3,2
            D       0FFFFFFFFH,STACC
            DD      BSACC2
            DB      9,6,3
            DD      0,0

DD      BSNBRS2
            DB      16,1,1
            DD      0,0

DD      BSCHK2
            DB      'END#           ',1,3,0

DB      6,3,2
            DD      0FFFFFFFFH,STACC
            DD      SACC2
            DB      9,6,3
            DD      0,0

KEYBOARD MONITOR .RCEDURE

PAGE
;KEYBOARD MONITOR PROCEDURE
            PUBLIC  KEYB
KEYB        PROC    NEAR
            MOV     AL,KEYBS        ;$$$SECURITY CHECK$$$
            XOR     AL,AL
            JNZ     KEYB0           ;$$$KEYBOARD LOCKED$$$
            CALL    KEYSC           ;SCAN KEYBOARD FOR KEY
                                    DEPRESSED
            CMP     AL,XNKEY
            JL      KEYB1
KEYB0:      RET                     ;NO KEY OR NON-EXIST KEY
KEYB1:      XOR     CX,CX
            CMP     AL,10
            JL      KNMBR           ;NUMBER 0-9
            XCHG    KCMD,AL         ;ROTATE COMMANDS
            MOV     KPCMD,AL        ;SAVE PREVIOUS COMMAND
            SUB     AL,10
            MOV     CL,AL
            PUSH    CX              ;SAVE JUMP TABLE INDEX
            MOV     CL,KCNT         ;NUMBER OF DIGITS ALLOWED
            CMP     KNDG,0          ;NUMBER OF DIGITS ENTERED
            JZ      KEYB4           ;NO DATA ENTERED
            MOV     DI,KPTR         ;OFFSET OF DATA STORAGE IF ANY
            MOV     SI,OFSET KBIN   ;TEMPORARY BINARY STORAGE
```

```
            MOV      BX,OFFSET SCRTCH
            MOV      AX,KBPTR        ;OFFSET OF DATA ENTERED
            CMP      KTPE,KALPHA     ;CHECK DATA TYPE
            JE       KEYB2           ;ALPHA
            PUSH     AX              ;SAVE KEYBOARD BUFFER ADDRESS
            PUSH     SI
            PUSH     BX
            PUSH     CX
            CALL     ASCBN           ;CONVERT TO BINARY
            PUSH     SI              ;POINTER TO CONVERTED BINARY
                                      NUMBER
            MOV      AX,OFFSET KLLMT
            PUSH     AX              ;LOWER LIMIT
            CALL     DBCMP           ;COMPARE
            SAL      AX,1
            JC       KEYB5           ;ERROR-NUMBER/LOWER LIMIT
            MOV      AX,OFFSET KULMT
            PUSH     AX              ;UPPER LIMIT
            PUSH     SI              ;CONVERTED BINARY NUMBER
            CALL     DPCMP           ;COMPARE
            SAL      AX,1
            JC       KEYB5           ;ERROR-UPPER LIMIT/NUMBER
            MOV      CL,KTPE
            CMP      CL,KDWRD
            JNE      KEYB2
            INC      SX              ;ADJUST DWORD COUNT
KEYB2:      MOV      AX,DS           ;TRANSFER DATA ENTERED
            CMP      KPTR+2,AX
            JE       KEYB3           ;DESTINATION=EE PROM
            MOV      BX,KPTR
KEYB2A      LODSB
            CALL     WEEPRM          ;DESTINATION=EE PROM
            INC      BX
            LOOP     KEYB2A
            JE       KEYB4           ;NO TRANSFER, LEAVE IN KY
REP         MOVSB

RO Assembler 03-006-04

KEYBOARD MONITOR PROCEDURE

KEYB4:      POP      BX              ;RETRIEVE JUMP TABLE INDEX
            SHL      BX,1            ;COMPUTE JUMP ENTRY
            JMP      KEYJT [BX]      ;PROCESS KEY
KEYB5:      POP      BX
            CALL     KERR
            RET
KNMBR:,     ADD      AL,30H          ;CONVERT TO ASCII
            CLD
            MOV      SI,OFFSET KBFR+1
            MOV      DI,OFFSET KBFR
MOV         CX,SKBFR-1
REP         MOVSB
                                     ;ROTATE KBFR TO LEFT
            STOSB                    ;ADD NEW CHARACTER TO RIGHT
            INC      KNDG            ;DIGIT COUNT
            CMP      KDSP,0          ;CHECK FOR DISPLAY
            JZ       KNMBR3          ;NO DISPLAY ALLOWED
            MOV      DI,OFFSET DBFR-1
            XOR      CH,CH
            MOV      CL,KDSP
            ADD      DI,CX
            MOV      SI,OFFSET KBFR+SKBFR
            MOV      CL,KCNT
            SUB      SI,CX
            MOV      KBPTR,SI        ;SAVE KBFR OFFSET
            PUSH     DI              ;SAVE START OF DISPLAY
            PUSH     CX              ;SAVE NUMBER OF CHARACTERS IN
                                      DISPLAY
            MOV      BL,KTPE         ;TYPE OF ENTRY BEING PROCESSED
            CMP      BL,KREAL
            JNE      KNMBR1
            POP      CX
            INC      CX              ;ADD DECIMAL POINT TO COUNT
            PUSH     CX
            SUB      CX,3            ;REAL ENTRY
KNMBR1:
REP         MOVSB                    ;MOVE KBFR TO DBFR
            CMP      BL,KREAL        ;CHECK FOR REAL ENTRY
            JNE      KNMBR2
            MOV      AL,','          ;REAL ENTRY
            STOSB
            MOV      CL,2            ;MOVE FRACTION
REP         MOVSB
KNMBR2:     MOV      AX,DKSP         ;START OF MESSAGE (1-16)
            MOV      AL,05H          ;CURSOR LINE, ON
            PUSH     AX
```

```
            CALL    DISP
KENTR3:     RET
KENTR:      NOP                         ;ENTER KEY - SSSNO PROGRAMSSS
KVOID:      MOV     AH,MOVP             ;VOID KEY
            MOV     AL,TOTS             ;TOTAL STATUS
            CMP     AH,1
            JE      KVOID1              ;MONEY ORDER VOID
            CMP     AH,2
            JE      KVOID2              ;VENDOR PAYMENT VOID
            CALL    KERR                ;ERROR-CLEAR ENTRY & BEEP
            RET

;CAMT,CFEE INDEX
......      ..,..
            MOV     CX,CCNT             ;# OF MO/VP ENTERED
            CMP     AL,0
            JNZ     KVOID4              ;TOTAL KEY DEPRESSED, VOID ALL
            MOV     AL,4                ;VOID LAST ENTRY
            DEC     CL
            MUL     CL
            MOV     BX,AX
            MOV     CL,1
KVOID4:     PUSH    CX                  ;# OF ENTRIES TO BE VOIDED
KVOID5:     DEC     CCN                 ;REDUCE COUNT
            DEC     CVCNT
            CMP     TOTS,1
            JNZ     KVOID6
            DEC     CTCNT               ;REDUCE TOTAL TRANSACTIONS
KVOID6:     LOOP    KVOID5
            POP     CX
            PUSH    CX
            PUSH    DI                  ;SAVE CMAMT/CVAMT OFFSET
KVOID7:     MOV     SI,OFFSET CAMT
            ADD     SI,BX
            MOV     DI,OFFSET CTOT
            PUSH    SI
            PUSH    DI
            CALL    DPSUB               ;CTOT=CTOT-MO/VP
            CMP     MOVP,1
            JNE     KVOID9
            PUSH    SI                  ;REDUCE FEES
            CMP     TOTS,0
            JE      KVOID8
            MOV     SI,OFFSET CFEE      ;SUBTRACT FEE FROM CTOT
            ADD     SI,CX
            PUSH    SI
            PUSH    DI
            CALL    DPSUB               ;CTOT=CTOT-CFEE
KVOID8:     XOR     AX,AX               ;ZERO FEE
            MOV     [SI],AX
            MOV     [SI+2],AX
            POP     SI
KVOID9:     POP     DI
            POP     SI
            PUSH    DI
            CALL    DPSBU               ;CMAMT/CVAMT=CMAMT/CVAMT-MO/VP
            POSH    DI
            CMP     TOTS,1
            JNZ     KVOID10
            MOV     DI,OFFSET CTAMT     ;REDUCE TOTAL AMOUNT
            PUSH    SI
            PUSH    DI
            CALL    DPSUB
KVOID10:    POP     DI
            XOR     AX,AX
            MOV     [SI],AX             ;ZERO CAMT
            MOV     [SI+2],AX
            INC     BX
            INC     BX
            CALL    PWRON               ;POWER ON
            RET
KSTRT1:     MOV     AL,KSTRTN           ;START DATA
            MOV     SI,OFFSET KSTRTD
            CALL    KINIT               ;INITIALIZE KEYBOARD AND
                                        ;DISPLAY VARIABLES
            RET
KNFEE:      MOV     FECC,1              ;NO FEE KEY - FECC=1
            RET
KID:        MOV     SI,OFFSET KBIN      ;ID KEY
            LODSB
            MOV     CID,AL
            PUSH    ES                  ;CHECK FOR VALID ID
            MOV     AX,EPRM
```

```
                MOV     CFEE+20BX1,AX
                POP     ES
KND3:           RET
KND4:           POP     ES                      ;AMOUNTS EXCEEDED-SUBTRACT
                                                LAST AMOUNTS
                MOV     SI,OFFSET KBIN
                MOV     DI,OFFSET CTOT
                PUSH    SI
                PUSH    DI
                PUSH    SI
                CALL    DPSUB                   ;CTOT=CHANT--AMT ENTERED
                PUSH    ES
                CALL    DPSUB                   ;CHANT=CHANT-AMT ENTERED
                PUSH    ES
                JMP     KNOE                    ;ERROR
KTRNS:          MOV     AL,KTRNSN               ;TRANSMIT KEY
                MOV     SI,OFFSET KTRNSD
                CALL    KINIT                   ;INITIALIZE KEYBOARD &
                                                DISPLAY VARIABLES
                RET
KDEFN:          MOV     AL,KDEFNN               ;DEFINE KEY
                MOV     SI,OFFSET KDEFND
                CAL     KINIT                   ;INITIALIZE KEYBOARD &
                                                DISPLAY VARIABLES
                STOSN
                MOV     AL,MOVP                 ;DISPLAY OR PRINT TOTALS
                JE      KTOTL6
                CMP     AL,2                    ;VENDOR PAYMENT TOTAL
                JE      KTOTL3
                CMP     AL,1                    ;MONEY ORDER TOTAL
                JE      KTOTL1
                CALL    KERR
                RET
KTOTL1:         MOV     CX,CONT                 ;MONEY ORDER TOTAL
                MOV     SI,OFFSET CFEE-4
                MOV     DI,OFFSET CTOT
KTOTL2:         ADD     SI,4                    ;FEE ADDRESS
                PUSH    SI
                PUSH    DI
                CALL    DPADD                   ;ADD UP ALL FEES
                LOOP    KTOTL2                  ;SUM TOTAL TRANSACTIONS
KTOTL3:         MOV     CX,CONT
                AD      CTONT,CX
                MOV     SI,OFFSET CAMT-4
                MOV     DI,OFFSET CTOT
KTOTL4:         ADD     SI,4
                PUSH    SI
                PUSH    DI
                CALL    DPADD
                LOOP    KTOTL4
                PUSH    DI
                MOV     SI,OFFSET CTAMT
                PUSH    SI                      ;SUM MACHINE TOTAL
                CALL    DPADD
                MOV     SI,OFFSET NOTMSG        ;NO TOT
                CMP     MOVP,1
                JE      KTOTL5
                MOV     SI,OFFSET VPTMSG        ;VP TOT
KTOTL5:         MOV     DI,OFFSET DBFR
                PUSH    DI                      ;DBFR ADDRESS FOR DISPLAY
                MOV     CX,7
        REP     MOVS    ES:BYTE PTR[DI],CS:[SI]
                MOV     SI,OFFSET CTOT          ;CONVERT TO ASCII & DISPLAY
                MOV     CX,OFFSET SCRTCH
                MOV     AH,9
                MOV     AL,KREAL
                PUSH    SI
                PUSH    DI
                PUSH    CX
                PUSH    AX
                CALL    BNASC                   ;CONVERT TO ASCII
                MOV     AX,SDBFR
                PUSH    AX
                MOV     AX,120H                 ;BLINKING DISPLAY, NO CURSOR
                PUSH    AX
                CALL    DISP                    ;DISPLAY
                RET
KTOTL6:         NOR                             ;TOTAL DISPLAY/REPORTS-$$$NO PROGRAM$$$

KSHFT:          MOV     SHFT,1                  ;DAY/SHIFT KEY
                RET
KDISP:          MOV     DSPR,1                  ;DISPLAY KEY - DSPR=1
                RET
KPRNT:          MOV     DSPR,2                  ;PRINT KEY - DSPR=2
```

```
         MOV      AL,MOVP
         CMP      AL,0
         JNZ      KPRNT1           ;MO/VP PRINT
         RET
KPRNT1:  MOV      AL,CKPRS         ;$$$ SECURITY CHECK $$$
         XOR      AL,AL
         JZ       KPRNT2           ;OK TO PRINT MONEY
                                   ORDERS/VENDOR PAYMENTS
                                   ;PRINTER DISABLED - IGNORE
         RET                       PRINT COMMAND
                                   ;PRINT CHECK - $$$ NO PROGRAM
KPRNT2:  NOP                       $$$

KEYB     ENDP
SUBTTL            KEYBOARD INITIALIZATION PROCEDURE
```

PAGE 66,132

```
;*************************************************************
;***                                                       ***
;***   PRINTER DRIVER FOR SMSD. THIS PROGRAM ACCEPTS STRING ***
;***   DATA AND TRANSFORMS IT INTO A LIST OF "CELL SPECS"   ***
;***   WHICH ARE SORTED AND PROCESSED TO GENERATE A LINE AT A ***
;***   TIME OF PIXEL DATA TO DRIVE THE FOUR PRINT SOLENOIDS ***
;***   OF A _____ DOT MATRIX PRINTER                    ***
;***   THE ALGORITHM IS EXPLAINED IN A SEPARATE DOCUMENT    ***
;***   TITLED "_____"                                   ***
;*************************************************************
```

| | | | |
|---|---|---|---|
| STACK | SEGMENT | PARA | STACK 'STACK' |
| STACK_BOTTOM | LABEL | WORD | |
| | ORG | OFFSET $+1FEH | |
| STACK_TOP | LABEL | WORD | |
| STACK | ENDS | | |
| DATA | SEGMENT | PARA | MEMORY 'DATA' |
| NEXT_CELL | LABEL | WORD | |
| | ORG | OFFSET $+2 | |
| TOTAL_CELLS | LABEL | WORD | |
| | ORG | OFFSET $+2 | |
| XCOORD | LABEL | WORD | |
| | ORG | OFFSET $+2 | |
| YCOORD | LABEL | WORD | |
| | ORG | OFFSET $+2 | |
| FONT | LABEL | BYTE | |
| | ORG | OFFSET $+1 | |
| DIRECT | LABEL | BYTE | |
| | ORG | OFFSET $+1 | |
| WIDTH | LABEL | BYTE | |
| | ORG | OFFSET $+1 | |
| HEIGHT | LABEL | BYTE | |
| | ORG | OFFSET $+1 | |
| HSPACE | LABEL | BYTE | |
| | ORG | OFFSET $+1 | |
| VSPACE | LABEL | BYTE | |
| | ORG | OFFSET $+1 | |
| IPT_OFFS | LABEL | WORD | |
| | ORG | OFFSET $+2 | |
| HORIZ | LABEL | WORD | |
| | ORG | OFFSET $+2 | |
| VERT | LABEL | WORD | |
| | ORG | OFFSET $+2 | |
| CSPECS_START | LABEL | WORD | |
| | ORG | OFFSET $+2 | |
| ACTIVE_CELL_TABLE | LABEL | WORD | |
| | ORG | OFFSET $+(203*45) | |
| ACTIVE_LIST | LABEL | WORD | |
| | ORG | OFFSET $+2 | |
| THIS_ENT | LABEL | WORD | |
| | ORG | OFFSET $+2 | |
| NEXT_ENT | LABEL | WORD | |
| | ORG | OFFSET $+2 | |
| FREE_LIST | LABEL | WORD | |
| | ORG | OFFSET $+2 | |

```
            MOV     DI,OFFSET ID        ;EEPROM ADDRESS
            MOV     CX,NID              ;NUMBER OF IDS
            REPNE   SCASB
            POP     ES
            JB      KID1
            MOV     CID,0               ;ZERO CURRENT ID
            CALL    KERR                ;ERROR-WIPE OUT ENTRY AND
                                        BEEP
KID1:       RET                         ;MATCH FOUND
KMO:        MOV     SI,OFFSET KBIN      ;MONEY ORDER KEY
            MOV     DI,OFFSET CTOT
            PUSH    SI
            PUSH    DI
            CALL    DPADD               ;CTOT=CTOT+AMT ENTERED
            MOV     DI,OFFSET CMAMT
            PUSH    SI
            PUSH    DI
            CALL    DPADD               ;CMAMT=CMAMT+AMT ENTERED
            PUSH    ES
            MOV     AX,EPRM
            MOV     ES,AX
            MOV     DI,OFFSET MONTC     ;EEPROM ADDRESS
            MOV     AX,CCNT             ;CHECK NUMBERS
            CMP     AX,NTR              ;MONEY ORDERS EXCEEDED PER
            JGE     KMOE                 SYSTEM
            CMP     AX,ES:WORD PTR[DI]
            JGE     KMOE                ;MONEY ORDERS EXCEEDED PER
                                         MACHINE
            MOV     SI,OFFSET CTOT      ;CHECK AMOUNT PER CUSTOMER
            ADD     DI,2
            PUSH    SI
            PUSH    DI
            CALL    DPCMP               ;COMPARE TWO DOUBLE
                                         PRECISION NUMBERS
            CMP     AL,1
            JE      KMO4                ;CTOT MAX AMT PER CUSTOMER
            MOV     SI,OFFSET CMAMT     ;CHEC AMOUNTS PER MACHINE
            ADD     DI,4
            PUSH    SI
            PUSH    DI
            CALL    DPCMP               ;COMPARE TWO DOUBLE
                                         PRECISION NUMBERS
            CMP     AL,1
            CALL    KERR                ;ERROR - CLEAR ENTRY & BEEP

RO Assembler 03-06-84                   Page 1-13
KEYBOARD MONITOR PROCEDURE

KMO0:       MOV     MOVF,1              ;MO/VP INDICATOR
            INC     CCNT
            INC     CMCNT
            MOV     AL,4
            MUL     BL
            MOV     BX,AX               ;CAMT & CFEE INDEX
            MOV     AX,KBIN             ;LOW BYTES OF MO
            MOV     CAMT[BX],AX
            MOV     AX,KBIN+2           ;HIGH BYTES OF MO
            MOV     CAMT[BX],AX
            MOV     AL,FEEC             ;CHECK IF FEE IS TO BE
                                         COMPUTED
            CMP     AL,0
            JE      KMO3                ;NO FEE
            PUSH    ES
            MOV     AX,EPRM
            MOV     ES,AX
            MOV     SI,OFFSET KBIN      ;FIND FEE
            MOV     DI,OFFSET FEELNT-9
            MOV     CX,NFEE
KMO1:       ADD     DI,8                ;$$$ORDER CHANGED$$$
            PUSH    SI
            PUSH    DI                  ;$$$WRONG SEGMENTS$$$
            CALL    DPCMP               ;COMPARE TWO DOUBLE
                                         PRECISION NUMBERS
            CMP     AX,1                ;FEE FOUND-MONEY ORDER
            JNE     KMO2                $<=$BREAKPOINT
            LOOP    KMO1                ;NEXT FEE
KMO2:       ADD     DI,4                ;FEE ADDRESS
            MOV     AX,ES:WORD PTR[DI]
            MOV     CFEE[BX],AX
            ADD     DI,2
            MOV     AX,ES:WORD PTR[DI]
```

```
BACK              LABEL       WORD
                  ORG         OFFSET $+2
FWD               LABEL       WORD
                  ORG         OFFSET $+2
NUMBER_ACTIVE     LABEL       BYTE
                  ORG         OFFSET $+1
SWAPPED           LABEL       BYTE
                  ORG         OFFSET $+1

;     THIS IS THE OUTPUT LINE BUFFER FOR SOLENOID DATA

BUFF              LABEL       BYTE         ; ROOM FOR 16 BYTES
                  ORG         OFFSET $+16  ; LAST 2 FOR OVERFLOW

BIT               LABEL       BYTE         ; HOLDS POSITION IN SCANLINE
                  ORG         OFFSET $+1
SCANLINE          LABEL       WORD         ; HOLDS CURRENT SCANLINE
                  ORG         OFFSET $+2
PR_SWAOGM         LABEL       BYTE
                  ORG         OFFSET $+1
SOL               LABEL       BYTE         ; HOLDS VAL OF CURRENT
                  ORG         OFFSET $+1   ; SOLENOID
INSERTED          LABEL       WORD         ; NUMBER OF CSPECS WHICH
                  ORG         OFFSET $+2   ; HAVE BEEN MADE ACTIVE
NXTZCM            LABEL       WORD         ; OFFSET OF NXT CSPEC
                  ORG         OFFSET $+2   ; TO EXAMINE

;     FOR SIMULATION PURPOSES THIS VARIABLE WILL REPRESENT
;     THE IO PORT WHICH CONTROLS THE PRINTER THIS WILL HAVE
;     TO BE CHANGED TO AN I/O INSTRUCTION WHICH WRITES TO AN
;     IO SEGMENT ADDRESS

PRINT_PORT        LABEL       BYTE
                  ORG         OFFSET $+1

;     TEST DATA- TO BE REMOVED AFTER DEBUGGING IS DONE
;     THIS SPECIFIES 3 STRINGS TO BE PRINTED

STRING_LIST       DW          3              ;3 STRING DESCRIPTORS
                  DW          OFFSET STRING1
                  DW          OFFSET STRING2
                  DW          OFFSET STRING3

STRING1           DW          4              ;X COORDINATE
                  DW          0              ;Y COORDINATE
                  DB          AFONT          ;STANDARD FONT
                  DB          DOWN           ;CHECK ORIENTATION
                  DB          3              ;CHARACTER COUNT
                  DB          'ABC'          ;THE STRING

STRING2           DW          0              ;X COORDINATE
                  DW          0              ;Y COORDINATE
                  DB          AFONT          ;STANDARD FONT
                  DB          RIGHT          ;RECEIPT ORIENTATION
                  DB          4              ;NUMBER OF CHARS
                  DB          'TX_1'         ;THE STRING

STRING3           DW          25             ;X COORDINATE
                  DW          10             ;Y COORDINATE
                  DB          AFONT          ;STANDARD FONT
                  DB          LEFT           ;BACKWARDS DIRECTION
                  DB          2              ;CHAR COUNT
                  DB          'HI'           ;THIRD STRING

FREE_SPACE        LABEL       WORD           ;SHOULD BE ENOUGH SPACE
                  ORG         $+(30*6)       ;FOR 30 CELL SPECS
END_DATA          LABEL       WORD
DATA              ENDS
```

;**********************************************************
;EQUATES
;**********************************************************

```
MAX_ACTIVE_CELLS      EQU     64
SIZE_OF_ACT           EQU     15
CSPEC_SIZE_IN_BYTES   EQU     8

RIGHT                 EQU     0
LEFT                  EQU     1
UP                    EQU     2
DOWN                  EQU     3

;OFFSETS WITHIN AN ACTIVE CELL TABLE ENTRY.

ACT_CSPEC_INDEX       EQU     0
ACT_BACK_PTR          EQU     2
ACT_FWD_PTR           EQU     4

;OFFSETS WITHIN A CELL SPEC

CSPEC_SCANLINE        EQU     0
CSPEC_ROWOFFS         EQU     2
CSPEC_WIDTH           EQU     4
CSPEC_HEIGHT          EQU     5
CSPEC_XBYTEOFFS       EQU     6
CSPEC_XBITOFFS        EQU     7

;OFFSETS WITHIN A FONT DESCRIPTOR

FDESC_WIDTH           EQU     0
FDESC_HEIGHT          EQU     1
FDESC_HSPACE          EQU     2
FDESC_VSPACE          EQU     3
FDESC_LFTOFFS         EQU     4

;OFFSETS WITHIN A STRING DESCRIPTOR

SDESC_XCOORD          EQU     0
SDESC_YCOORD          EQU     2
SDESC_FONT            EQU     4
SDESC_DIRECT          EQU     5
SDESC_COUNT           EQU     6
SDESC_CHARS           EQU     7

MAX_SCANS             EQU     700     ;MAX SCANLINES PER MONEY ORDER
BITS_PER_SCAN         EQU     240     ;WIDTH OF ONE SCANLINE IN DOTS

;EQUATES USED WITH PRINT SHADOW REGISTER     PR_SHADOW

SOL1                  EQU     01H
SOL2                  EQU     02H
SOL3                  EQU     04H
SOL4                  EQU     08H
NOT_SOLENOIDS         EQU     0F0H
MTRDRV                EQU     010H
NOT_MTRDRV            EQU     0EFH
MTRSTP                EQU     020H
NOT_MTRSTP            EQU     0DFH
CLAMP_ON              EQU     080H
CLAMP_OFF             EQU     07FH

AFONT                 EQU     0
BFONT                 EQU     1

CODE                  SEGMENT WORD PUBLIC 'CODE'

ASSUME  CS:CODE
                      ASSUME  DS:DATA
                      ASSUME  SS:STACK

;****************************************************************
; DRIVER ROUTINE :   THIS IS FOR DEBUGGING-SHOULD COME OUT LATER
;****************************************************************

TEST_STARTS:          MOV     AX,DATA
                      MOV     DS,AX
```

```
                            MOV     AX,STACK        ;SET UP STACK SEG
                            MOV     SS,AX
                            MOV     SP,OFFSET STACK_TOP ;SET UP STK PTR

MOV     DX,OFFSET FREE_SPACE
                            MOV     BX,OFFSET STRING_LIST
                            CALL    PRNTR
        TEST_DONE:          JMP     TEST_DONE

;****************************************************************
;END OF DEBUGGING CODE
;****************************************************************

;****************************************************************
;
; THIS IS THE MAIN ENTRY POINT FOR THE UNGLE PRINTER DRIVER
; PRNTR EXPECTS TWO PARAMETERS:
;
;       1. THE OFFSET OF THE STRING LIST TABLE SHOULD BE IN BX reg
;
;       2. THE OFFSET OF UNRESTRICTED WORKSPACE ABOVE ALL STRINGS
;          AND OTHER DATA SHOULD BE IN DX reg
;
;****************************************************************

PRNTR:              PUSHA   ***** 80186 INST. ;SAVE ALL REGISTERS
                                                    ; REPLACED BY THE FOLLOWING
                            PUSH    AX
                            PUSH    BX
                            PUSH    CX
                            PUSH    DX
                            PUSH    DS
                            PUSH    ES
                            PUSH    SS
                            PUSH    DI
                            PUSH    SI
                            PUSH    BP

MOV     AX,DATA         ;SET UP SEGMENT REGISTER
                            MOV     DS,AX

;  GET THE OFFSET OF UNRESTRICTED WORKSPACE IN WHICH WE MAY
;  BUILD THE TABLES. CALLER SHOULD SUPPLY THIS IN DX REGISTER

MOV     NEXT_CELL,DX    ;OFFSET OF FREE AREA IN DATA SEGMENT
                                                    ; FOR TABLES
                            MOV     TOTAL_CELLS,0   ;COUNTER FOR CELL SPECS
                            MOV     CSPECS_START,DX ;SAVE ORIGIN OF CELL SPEC TABLE.

SUB     CX,CX

;  BX HOLDS OFFSET IN DATA SEGMENT OF STRING LIST

MOV     CL,[BX]         ;GET NUMBER OF STRINGS TO PROCESS
                            INC     BX              ;BX HOLDS OFFSET OF WORD HOLDING
                                                    ;OFFSET OF FIRST STRING IN LIST
;  CHECK FOR ZERO STRINGS
                            CMP     CL,0
                            JG      DO_A_STRING
                            JMP     LIST_DONE

;****************************************************************
; PROCESS EACH STRING IN THE STRING LIST. BX HOLDS THE OFFSET OF THE FIRST
; ENTRY IN THE STRING L      . CL HOLDS THE NUMBER OF STRINGS TO PROCESS
; CSPECS_START HOLDS THE OFFSET OF THE AREA WHERE THE CELL SPECS WILL BE
; BUILT AND SORTED.
;****************************************************************

DO_A_STRING:        MOV     DX,[BX]         ;DX HOLDS OFFSET OF NEXT STRING DESC
                            INC     BX              ;MAKE BX POINT TO WORD HOLDING
```

```
                    INC      BX              ;OFFSET OF NEXT STRING DESC AND
                    PUSH     BX              ;SAVE ON STACK FOR NEXT LOOP

; NOW LOAD PARAMETERS FOR CURRENT STRING

MOV      BX,DX           ;OFFSET OF CURRENT STRING DESC
                    MOV      AX,[BX+STDESC_XCOORD]
                    MOV      XCOORD,AX

MOV      AX,[BX+STDESC_YCOORD]
                    MOV      YCOORD,AX

MOV      AL,[BX+STDESC_FONT]
                    MOV      FONT,AL

MOV      AL,[BX+STDESC_DIRECT]
                    MOV      DIRECT,AL

PUSH     BX              ;SAVE WHILE DOING NEXT

SUB      BX,BX           ;MULTIPLY FONT BY 6
                    MOV      BL,FONT         ;TO MAKE IT AN INDEX
                    SHL      BX,1            ;INTO THE FONT_SPEC_TABLE
                    MOV      DX,BX
                    SHL      BX,1
                    ADD      BX,DX

; NOW GET THE PARAMETERS FOR THE FONT REQUESTED

ADD      BX,OFFSET FONT_SPEC_TABLE

MOV      AL,CS:[BX+FDESC_WIDTH]
                    MOV      WIDTH,AL        ; WIDTH IN BYTES

MOV      AL,CS:[BX+FDESC_HEIGHT]
                    MOV      HEIGHT,AL       ; HEIGHT IN BITS

MOV      AL,CS:[BX+FDESC_HSPACE]
                    MOV      HSPACE,AL

MOV      AL,CS:[BX+FDESC_VSPACE]
                    MOV      VSPACE,AL

MOV      AX,CS:[BX+FDESC_IFTOFFS]
                    MOV      IFT_OFFS,AX

; NOW INITIALIZE ROW/COLUMN POSITIONERS

MOV      HORIZ,0
                    MOV      VERT,0

POP      BX              ; RESTORE OFFSET OF CURRENT STRING DESCRIPTOR
                    PUSH     CX              ; SAVE STRING COUNTER

;SET UP REGISTERS TO LOOP THROUGH CHARACTERS OF CURRENT STRING

MOV      SI,NEXT_CELL
                    ADD      BX,STDESC_COUNT ;BX IS OFFSET OF CHARACTER COUNT
                    SUB      CH,CH
                    MOV      CL,[BX]         ;LOOP COUNT = NUMBER OF CHARS

DO_A_CHAR:          INC      BX              ;POINT TO CURRENT CHAR
                    SUB      AX,AX
                    MOV      AL,[BX]         ;GET THE CHAR
                    PUSH     BX              ;SAVE PTR FOR NEXT LOOP
                    SHL      AX,1
                    ADD      AX,IFT_OFFS     ;POINT TO IFT ENTRY FOR CHAR
                    MOV      BX,AX
                    MOV      AX,CS:[BX]      ;GET FONT MEM OFFSET FOR CHAR

; NOW BUILD THE CELL SPEC POINTED TO BY SI REG

MOV      [SI+CSPEC_MEMOFFS],AX ;MEM OFFSET
```

```
        MOV     AX,YCOORD
        ADD     AX,VERT
        MOV     [SI+CSPEC_SCANLINE],AX  ;CHAR ORIGIN SCANLINE

MOV     AX,XCOORD
        ADD     AX,HORIZ
        MOV     DX,AX
        AND     AX,0007H
        MOV     [SI+CSPEC_BITOFFS],AL   ;CHAR ORIGIN BIT REMAINDER

SHR     DX,1
        SHR     DX,1
        SHR     DX,1
        MOV     [SI+CSPEC_BYTEOFFS],DL  ;CHAR ORIGIN MOD BYTE

MOV     AL,WTH
        MOV     [SI+CSPEC_WIDTH],AL     ;CHAR WIDTH IN BYTES

MOV     AL,HEIGHT
        MOV     [SI+CSPEC_HEIGHT],AL    ;CHAR HEIGHT IN BITS
```

;***************************************************
; NOW CHECK DIRECTION TO COMPUTE CUMULATIVE POSITIONERS FOR NEXT
; CHARACTER THE DRAWING SHOWS THE PRINT ORIENTATIONS
;***************************************************

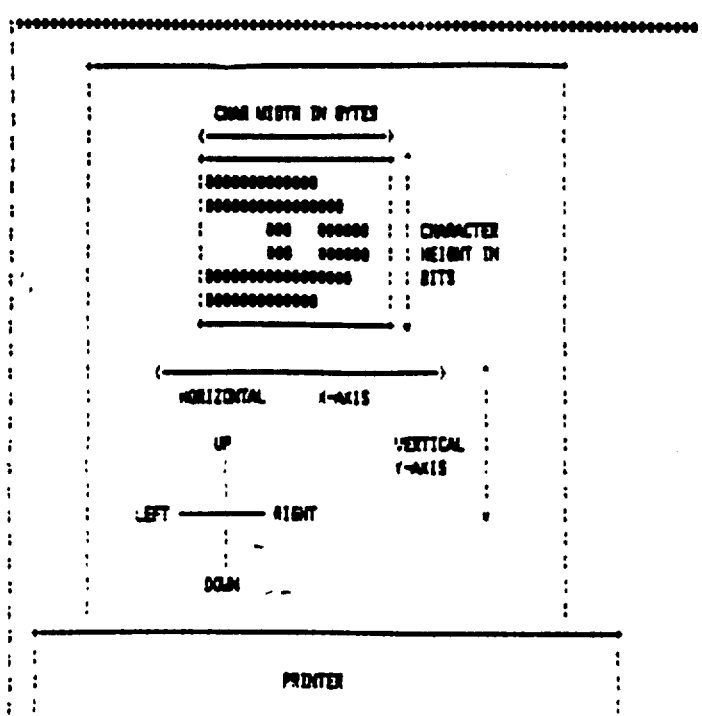

```
                00000...    .  .
; FONT:         ..0..0..    :  :
;               ..0..0..    5  :
; Letter "A"    ..0..0..    :  7    CHAR WIDTH IN BYTES   = 1
                00000...       :    CHAR HEIGHT IN BITS   = 5
                               :    HORIZ SPACING IN BITS = 10
                               .    VERT SPACING IN BITS  = 7
                (------)
                  1 BYTE
```

```
;                       (— 16 —)
;
;*********************************************************
                SUB             AX,AX
TRY_RIGHT:      .
                -               DIRECT,RIGHT    ;NORMAL, SO TRY THIS  1   ) SAVE TIME
                --              TRY_UP          ;NOT RIGHT- GO ON
DO_RIGHT:       MOV             AL,HSPACE       ;NORMAL ORIENTATION ON A RECEIPT
                ADD             HORIZ,AX        ;NEXT CHAR IN THIS STRING WILL BE PLACED
                JMP             CSPEC_DONE      ;THIS CHARACTER'S HORIZONTAL SPACING
                                                ;TO THE RIGHT OF THIS CHARACTER
TRY_UP:         CMP             DIRECT,UP
                JNE             TRY_LEFT
DO_UP:          MOV             AL,VSPACE       ;NEXT CHAR WILL BE PLACED THIS
                SUB             VERT,AX         ;CHARS VERTICAL SPACING ABOVE
                JMP             CSPEC_DONE      ;THIS CHARACTER

TRY_LEFT:       CMP             DIRECT,LEFT     ;UPSIDE DOWN & BACKWARDS PRINTING
                JNE             DO_DOWN
DO_LEFT:        MOV             AL,HSPACE       ;NEXT CHAR WILL BE PLACED THIS
                SUB             HORIZ,AX        ;CHAR'S HORIZONTAL SPACING TO THE
                JMP             CSPEC_DONE      ;LEFT OF THIS CHARACTER

DO_DOWN:        MOV             AL,VSPACE       ;NEXT CHAR WILL BE PLACED THIS
                ADD             VERT,AX         ; CHAR'S VERTICAL SPACING BELOW
                                                ;THIS CHARACTER. NORMAL
                                                ; ORIENTATION FOR CHECK

CSPEC_DONE:     ADD             SI,CSPEC_SIZE_IN_BYTES
                INC             TOTAL_CELLS
                POP             BX              ;RESTORE OFFSET OF
                DEC             CX              ;THIS CHAR IN
                JZ              STRING_DONE     ;STRING DESCRIPTOR
                JMP             DO_A_CHAR

STRING_DONE:    POP             CX              ;RESTORE STRING LOOP CTR
                POP             BX              ;RESTORE OFFSET OF
                MOV             NEXT_CELL,SI    ;SAVE THE OFFSET
                DEC             CX              ;NEXT SLOT IN STRING
                JZ              SORT_CSPECS     ;TABLE
                JMP             DO_A_STRING

;*********************************************************
; IN-PLACE BUBBLE SORT OF CSPEC LIST INTO ASCENDING ORDER BASED ON
; CONTENTS OF 1ST WORD IN EACH CELL SPEC
;*********************************************************

SORT_CSPECS:    MOV             CX,TOTAL_CELLS
                DEC             CX              ;OUTER LOOP IS DONE N - 1 TIMES
O_LOOP:         PUSH            CX              ;SAVE OUTER LOOP COUNTER

MOV             BX,CSPECS_START ;BEGINNING OF TABLE TO SORT
                MOV             SWAPPED,0       ;SET FLAG CLEAR FOR NEXT INNER LOOP
                MOV             CX,TOTAL_CELLS  ;INNER LOOP IS DONE N - 2
                SUB             CX,2            ;TIMES
I_LOOP:         PUSH            CX              ;SAVE INNER LOOP COUNTER
                MOV             AX,[BX]         ;COMPARE ACT_CSPEC_INDICES FOR
                CMP             AX,[BX+8]       ;TWO ADJACENT CELLS. IF OUT OF
                JNB             NO_SWAP         ;ORDER, THEN SWAP THEIR CONTENTS
SWAP:                           CX              ;SAVE INNER LOOP CX
                                CX,CSPEC_SIZE_IN_BYTES/2  ;LOOP HERE ONCE FOR EACH
                                                ;WORD IN A CELL SPEC
SWAP_LOOP:      MOV             AX,[BX]         ;GET THE WORDS TO SWAP
                MOV             DX,[BX+8]
                MOV             [BX],DX         ;PUT THEM BACK IN SWAPPED
                MOV             [BX+8],AX       ;POSITIONS
                ADD             BX,2
                LOOP            SWAP_LOOP

POP             CX

MOV             SWAPPED,1       ;SET FLAG SAYING AT LEAST ONE SWAP
                                                ;IN THIS INNER LOOP
```

```
                        JP          NEXT_J

NO_SWAP:                ADD         BX,8           ;ADJUST POINTER UP ONE CELLSPEC

NEXT_J:                 POP         CX             ;RESTORE INNER LOOP COUNTER

LOOP        J_LOOP

CMP         SWAPPED,0      ;IF FLAG WAS SET, SWAPS WERE MADE
                        JNE         NOT_DONE       ;AND WE ARE NOT DONE
                        POP         CX             ;BUT IF FLAG WAS NOT SET,
                                                   ;RESTORE STACK
                        JP          LIST_DONE      ;AND GET OUT OF SORT ROUTINE

NOT_DONE:               POP         CX             ;RESTORE OUTER LOOP COUNTER
                        LOOP        I_LOOP

;****************************************************************
; CELL SPEC LIST IS SORTED AND READY TO PROCESS SEQUENTIALLY
; NOW FIRE UP THE PRINTER, BUILD SCANLINES, AND PRINT IT ALL
;****************************************************************

LIST_DONE:              CALL        REL_CLMP       ; RELEASE PAPER CLAMP
                        CALL        ACT_INIT       ; INITIALIZE ACTIVE LIST
                        MOV         SCANLINE,0
                        MOV         SOL,11H        ; READY FIRST SOLENOID
                        MOV         INSERTED,0
                        MOV         AX,CSPECS_START
                        MOV         NXTSCN,AX
                        CALL        SOLENOIDS_OFF  ; RELEASE ANY SOLENOIDS THAT
                                                   ; MIGHT INADVERTENTLY BE ON
                        CALL        MOTOR_ON       ; START MOVING PAPER

;****************************************************************
; THIS IS THE TOP OF THE LOOP WHICH IS TRAVERSED ONCE PER SCANLINE
; FIRST WE WAIT TILL CARRIAGE RETURN DETECTED, THEN BUILD A SCANLINE
; AND BUMP IT EVERY TIME THEREAFTER THAT A PRINT CLOCK SIGNAL IS
; DETECTED.
;****************************************************************

WAIT4RST:               CALL        PRTST
                        AND         AL,AL
                        JZ          WAIT4RST

;****************************************************************
; CHECK NOW TO DETERMINE WHETHER ALL SCANLINES HAVE BEEN MADE
; AND, IF SO, QUIT AND TURN OFF THE MOTOR BEFORE RETURNING
;****************************************************************

WEHAVERST:              CMP         SCANLINE,MAX_SCANS
                        JE          CHECK_PRINTED

CALL        BUILD_NXT_SCAN
                        MOV         BIT,0

;****************************************************************
; WAIT TILL PRINT CLOCK HAS BEEN ASSERTED
;****************************************************************

WAIT4CLK:               CALL        PRTST
                        AND         AH,AH
                        JZ          WAIT4CLK

; CHECK WHETHER ALL BITS IN THE SCANLINE HAVE BEEN ACCOUNTED FOR

WEHAVECLK:              CMP         BIT,BITS_PER_SCAN
                        JNE         OL_DE_BIT
                        INC         SCANLINE
                        JP          WAIT4RST

; TURN OFF THE LAST SOLENOID BY TURNING OFF ALL OF THEM
; THEN FIND THE STATE OF THE CURRENT BIT AND, IF TRUE,
; FIRE PROPER SOLENOID
```

```
DO_DE_BIT:           AND       PR_SHADOW, 0FFH  ; OFF ALL SOLENOIDS

CALL      ISOLATE_BIT      ; TEST BIT "BIT"
                     AND       AL,AL            ; TEST VALUE PUT HERE
                                                ; BY ISOLATE_BIT
                     JZ        DONT_FIRE

; WE WILL FIRE THE NEXT SOLENOID THIS TIME

FIRE_ONE:            MOV       DL,SOL
                     OR        PR_SHADOW,DL

;    WE MAY OR MAY NOT HAVE FIRED A SOLENOID BIT INTO THE SHADOW AT THIS POINT

DONT_FIRE:           INC       BIT              ; POINT TO NEXT BIT
                     CMP       SOL,SOL4         ; IF TRUE RESET TO SOL1
                     JE        SOL_IS_3
SOL_NOT_3:           SHL       SOL,1            ; OTHERWISE SET NEXT SOL
                     JMP       WRITE_SHADOW
SOL_IS_3:            MOV       SOL,SOL1                 ; RESETS SOL TO SOL1
                     ; WRITE THE VALUE IN THE SHADOW REGISTER TO THE OUTPUT PORT

WRITE_SHADOW:        MOV       AL, PR_SHADOW
                     MOV       PRINT_PORT,AL

; NOW WAIT FOR THE NEXT PRINT CLOCK

JMP       WAIT4CLK

; THE LAST SCANLINE SHOULD HAVE BEEN PRINTED.
                     ; NOW TURN OFF THE MOTOR AND ALL SOLENOIDS AND RETURN

CHECK_PRINTED:       CALL      MOTOR_OFF
                     CALL      SOLENOIDS_OFF

; NOW ALL DONE PRINTING, RETURN TO THE ROUTINE THAT CALLED PRNTR

;                    POPM      **** 80186 INST.  ; RESTORE ALL REGISTERS REPLACED BY
                                                 ; THE FOLLOWING

POP       BP
                               POP       SI
                               POP       DI
                               POP       SS
                               POP       ES
                               POP       DS
                               POP       DX
                               POP       CX
                               POP       BX
                               POP       AX

RET

;ROUTINES FOR MANAGING THE ACTIVE CELL LIST

;INITIALIZING THE ACTIVE CELL LIST

ACT_INIT:            MOV       BX,OFFSET ACTIVE_CELL_TABLE
                     MOV       CX,SIZE_OF_ACT
                     MOV       AX,01H
INIT_ACT:            MOV       [BX+ACT_FWD_PTR],AX  ;LINK EACH ENTRY BY
                     INC       AX                    ;MAKING EACH FORWARD
                     ADD       BX,6                  ;POINTER POINT TO THE
                     LOOP      INIT_ACT              ;NEXT ENTRY IN THE LIST

MOV       FREE_LIST,0          ;FREE LIST STARTS WITH 0th ENTRY
```

```
                        MOV         NUMBER_ACTIVE,0    ;ACTIVE LIST IS NUL
                                    ACTIVE_LIST,0FFFFH
                        JMP                            ;ALL DONE

; INSERTING A CELL SPEC INTO THE ACTIVE CELL LIST
; AX HOLDS INDEX INTO SORTED LIST OF CELL SPECS
; ALGORITHM IS:
;       OLD_ACTIVE = ACTIVE_LIST
;       ACTIVE_LIST = FREE_LIST
;       FREE_LIST = FREE_LIST(4)
;
;       ACTIVE_ENTRY(CSPINDX) = CELL SPEC INDEX
;       ACTIVE_ENTRY(BKPTR) = NULL   (THIS IS BACK PTR OF 1ST IN NEW ACT LIST)
;       ACTIVE_ENTRY(FWDPTR) = OLD_ACTIVE
;       IF OLD_ACTIVE NOT NULL THEN
;               OLD_ACTIVE_ENTRY(BKPTR) = ACTIVE_LIST

INSERT_INTO_ACT:
                        CMP         NUMBER_ACTIVE,MAX_ACTIVE_CELLS
                        JAE         TOO_MANY_INSERTS
;       MAKE OLD_ACT = ACTIVE_LIST CX USED TO HOLD OLD_ACTIVE
                        MOV         BX,ACTIVE_LIST
                        MOV         CX, BX

;       ACTIVE_LIST = FREE_LIST
                        MOV         SI, FREE_LIST
                        MOV         ACTIVE_LIST,SI

;       FREE_LIST = FORMER 3RD ENTRY IN FREE LIST. MULTIPLY INDEX BY 4
                        SHL         SI,1
                        MOV         DI,SI
                        SHL         SI,1
                        ADD         SI,DI
                        MOV         BX, OFFSET ACTIVE_CELL_TABLE
                        MOV         DI, [BX+SI+ACT_FWD_PTR]
                        MOV         FREE_LIST, DI

;       SI STILL POINTS TO OFFSET OF NEW ACTIVE ENTRY
;       FIX UP THREE ENTRIES IN NEWLY ACTIVE CELL
                        MOV         [BX+SI+ACT_CSPEC_INDEX], AX  ; INDEX OF CSPEC BEING ADDED
                        MOV         WORD PTR [BX+SI+ACT_BACK_PTR],0FFFFH
                        MOV         AX, CX
                        MOV         [BX+SI+ACT_FWD_PTR],AX
                        CMP         AX,0FFFFH
                        JZ          BUMP_ACTIVES

;       OLD_ACTIVE WAS NOT NULL. SO LINK ITS BACK PTR TO THE NEW HEAD OF ACTIVES
;       AX HOLDS OLD_ACTIVE. MULTIPLY IT BY 4
                        SHL         AX,1
                        MOV         SI,AX
                        SHL         SI,1
                        ADD         SI,AX
                        MOV         AX,ACTIVE_LIST
                        MOV         [BX+SI+ACT_BACK_PTR],AX
BUMP_ACTIVES:                       INC NUMBER_ACTIVE
TOO_MANY_INSERTS:       RET

; ROUTINE TO REMOVE COMPLETED CELL SPEC FROM ACTIVE LIST
; AND RETURN ITS SLOT TO FREE LIST. AX HOLDS INDEX INTO ACTIVE CELL TABLE OF
; ENTRY TO BE REMOVED

REMOVE_FROM_ACT:
                        CMP         NUMBER_ACTIVE,0    ;IF NONE WE HAVE
                                                       ; A PROBLEM
                        JG          OK_TO_REMOVE
                        JMP         TOO_MANY_REMOVALS
OK_TO_REMOVE:           MOV         BX,OFFSET ACTIVE_CELL_TABLE  ;HEAD OF TABLE
                        MOV         SI,AX              ;MULTIPLY INDEX BY 4
                        SHL         SI,1               ;TO MAKE IT A BYTE
                        MOV         CX,SI              ;INDEX INTO THE ACT
                        SHL         SI,1
                        ADD         SI,CX
```

```
                MOV     BX,[BX+SI+ACT_BACK_PTR]  ;SAVE THIS
                MOV     BACK,BX

MOV     BX,[BX+SI+ACT_FWD_PTR]   ;AND THIS
                MOV     FWD,BX

MOV     BX,FREE_LIST             ;LINK THIS ENTRY INTO
                MOV     [BX+SI+ACT_FWD_PTR],BX

MOV     FREE_LIST,AX             ;FREE LIST AHEAD OF ALL OTHERS
                CMP     BACK,0FFFFH              ;WAS HEAD OF ACT HOLDING
                JNE     NOT_FIRST                ;THE FIRST ENTRY IN FREE LIST
FIRST:          MOV     AX,FWD                   ;YES, IT WAS
                MOV     ACTIVE_LIST,AX           ;ACTIVE NOW POINTS TO WHAT
                                                 ;THIS ENTRY USED TO POINT TO
                MOV     SI,AX                    ;SAVE THIS INTO BYTE INDEX
                SHL     SI,1
                MOV     CX,SI
                SHL     SI,1
                ADD     SI,CX
                MOV     WORD PTR [BX+SI+ACT_BACK_PTR],0FFFFH
                                                 ;MAKE SUCESSOR'S
                                                 ;BACK PTR NULL
                                                 ;BECAUSE IT IS NEW HEAD
                                                 ;OF ACTIVE LIST
                DEC     NUMBER_ACTIVE
                RET                              ;ALL DONE

NOT_FIRST:      CMP     FWD,0FFFFH               ;IS ENTRY TO BE REMOVED IN MIDDLE
                JNE     MIDDLE
LAST:           MOV     SI,BACK                  ;NO, IT IS LAST IN LIST
                SHL     SI,1
                MOV     CX,SI                    ;SAVE THE PREDECESSOR'S
                SHL     SI,1                     ;FORWARD
                ADD     SI,CX                    ;POINTER
                MOV     WORD PTR [BX+SI+ACT_FWD_PTR],0FFFFH
                                                 ;NULL FWD PTR BECAUSE LAST
                DEC     NUMBER_ACTIVE
                RET                              ;ALL DONE

MIDDLE:         MOV     SI,FWD                   ;CELL TO BE REMOVED IS
                SHL     SI,1                     ;SOMEWHERE IN THE MIDDLE
                MOV     CX,SI
                SHL     SI,1                     ;SAVE PREDECESSOR'S
                ADD     SI,CX                    ;FWD POINTER
                MOV     AX,BACK                  ;POINT TO SUCESSOR
                MOV     [BX+SI+ACT_BACK_PTR],AX
                MOV     SI,AX                    ;AND MAKE
                SHL     SI,1                     ;SUCESSOR'S
                MOV     CX,SI                    ;BACK PTR
                SHL     SI,1                     ;POINT TO
                ADD     SI,CX                    ;PREDECESSOR
                MOV     AX,FWD
                MOV     [BX+SI+ACT_FWD_PTR],AX
                DEC     NUMBER_ACTIVE
TOO_MANY_REMOVALS: RET                           ;ALL DONE

;
; ROUTINE TO DETERMINE THE STATE OF A BIT IN THE SCANLINE BUFFER

ISOLATE_BIT:    SUB     BX,BX                    ; CLEAR THIS REGISTER
                MOV     BL,BIT                   ; GET INDEX OF BIT IN
                                                 ;  SCANLINE BUFFER
                MOV     DL,BL                    ; SAVE IT TEMPORARILY
                MOV     CX,3                     ; FOR DIVIDE BY 8 TO GET
                SHR     BX,CL                    ;  BYTE INDEX OF BUFF
                AND     DL,7                     ; FIND BIT REMAINDER
                INC     DL                       ; FOR BITS TO SHIFT OUT
                ADD     BX,OFFSET BUFF           ; POINT TO BYTE IN MEM
                MOV     AL,[BX]                  ; READ BYTE OF BUFF
                MOV     CL,DL                    ; SHIFT COUNT
```

```
                        SHL      AL,1         ; SHIFT DESIRED BIT OUT
                                               ; TO CARRY FLAG
                        JC       SET_BIT      ; IF CARRY THEN BIT = T
                        SUB      AX,AX        ; CLR AX IF BIT FALSE
                        RET
SET_BIT:                MOV      AX,1         ; SET AX IF BIT TRUE
                        RET

; ROUTINE TO TURN OFF ALL FOUR SOLENOIDS

SOLENOIDS_OFF:          AND      PR_SHADOW, NOT_SOLENOIDS
                        MOV      AL, PR_SHADOW
                        MOV      PRINT_PORT, AL
                        RET

; ROUTINE TO TURN MOTOR

MOTOR_ON:               OR       PR_SHADOW, MTRDRV
                        AND      PR_SHADOW, NOT_MTRSTP
                        MOV      AL, PR_SHADOW
                        MOV      PRINT_PORT, AL
                        RET

; ROUTINE TO TURN MOTOR OFF

MOTOR_OFF:              OR       PR_SHADOW, MTRSTP
                        AND      PR_SHADOW, NOT_MTRDRV
                        MOV      AL, PR_SHADOW
                        MOV      PRINT_PORT, AL
                        RET

; ROUTINE TO REMOVE ALL POWER FROM MOTOR

MTR_PWR_OFF:            AND      PR_SHADOW, NOT_MTRSTP
                        AND      PR_SHADOW, NOT_MTRDRV
                        MOV      AL, PR_SHADOW
                        MOV      PRINT_PORT, AL
                        RET

; ROUTINE TO FIRE A SOLENOID; WHATEVER VALUE IS IN SOL WHEN THIS ROUTINE
; IS CALLED WILL BE OUTPUT; ALL OTHER SOLENOIDS WILL BE TURNED OFF

FIRE_SOLENOID:          AND      PR_SHADOW, NOT_SOLENOIDS
                        MOV      AL, SOL
                        OR       PR_SHADOW, AL
                        MOV      PRINT_PORT, AL
                        RET

; ROUTINE TO SET THE STATE OF THE PAPER CLAMP TRUE, TO HOLD THE PAPER

SET_CLAMP:              OR       PR_SHADOW, CLAMP_ON
                        MOV      AL, PR_SHADOW
                        MOV      PRINT_PORT, AL
                        RET

; ROUTINE TO RELEASE THE PAPER CLAMP

REL_CLAMP:              AND      PR_SHADOW, CLAMP_OFF
                        MOV      AL, PR_SHADOW
                        MOV      PRINT_PORT, AL
                        RET
```

```
;**************************  ;***************************************
;
; ROUTINE TO BUILD THE NEXT SCANLINE USING THE ACTIVE CELL TABLE, THE CURRENT
; SCANLINE, AND ALL THE VALUES IN THE ACTIVE CELL SPECS
;
;**************************************************************************

;   FIRST, CLEAR OUT THE OLD BUFFER SO ALL NEW DATA MAY BE ORED IN

BUILD_NXT_SCAN:
                MOV     CX,80H          ; NUMBER OF WORDS TO CLEAR
                SUB     AX,AX           ; CLEAR THIS TO ZERO
                MOV     BX, OFFSET BUFF
CLR_BUFF:       MOV     [BX], AX
                INC     BX
                INC     BX
                LOOP    CLR_BUFF

;   NEXT FIND ANY NEW ACTIVE CELL SPECS TO INSERT INTO THE ACTIVE LIST
        ;   CHECK WHETHER ALL CSPECS HAVE BEEN MADE ACTIVE BY THIS TIME

CHECK4INSRT:    MOV     BX, INSERTED
                CMP     BX, TOTAL_CELLS
                JE      PROCESS_ACT

;   IF THEY HAVE NOT ALL BEEN PLACED INTO ACT THEN CHECK TO SEE IF ANY
        ;   WILL GO INTO ACT FOR THIS SCANLINE

MOV     BX, NXTZDK      ; OFFS OF NXT CSPEC TO CHECK
                MOV     AX,[BX]         ; AX NOW HAS SCANLINE
                CMP     AX,SCANLINE     ; IS IT = CURRENT SCANLINE?
                JNE     PROCESS_ACT     ; IF NOT, NO INSERTS

;   NOW INSERT CELLS INTO ACT WHILE THEIR SCANLINES ARE
        ;   EQUAL TO CURRENT SCANLINE

INSERT_CELL:    MOV     AX,BX           ; OFFS OF CSPEC TO INSERT
                INC     INSERTED        ; INDEX OF CSPEC TO GO IN
                CALL    INSERT_INTO_ACT
                ADD     NXTZDK, CSPEC_SIZE_IN_BYTES
                JMP     CHECK4INSRT

;   NOW PROCESS ALL ACTIVE CELLS FIRST CHECK WHETHER ANY ARE ACTIVE

PROCESS_ACT:    CMP     NUMBER_ACTIVE,0
                JB      SOME_R_ACTV
                RET                     ; BECAUSE NONE R ACTIVE

SOME_R_ACTV:    MOV     SI,ACTIVE_LIST  ; INDEX OF ACT OF 1ST ENT
                MOV     NEXT_ENT,SI     ; IS NEXT TO LOOK AT
NEXT_CSPEC:     MOV     SI,NEXT_ENT     ; NEXT IS CURRENT
                MOV     THIS_ENT,SI     ; ONE TO LOOK AT
                SHL     SI,1            ; MAKE THIS_ENT AN INDEX
                MOV     DI,SI
                OR      SI,1
                ST,DI

;   SAVE INDEX IN ACT OF NEXT ENTRY TO CHECK, MAY BE FFFF IF NO MORE

MOV     BX,OFFSET ACTIVE_CELL_TABLE
                MOV     BX,[BX+SI+ACT_FLD_PTR] ; LINK TO NXT ACTIVE CELL
                MOV     NEXT_ENT,BX

;   NOW GET OFFSET OF CSPEC TO EXAMINE FIRST; BX STILL HAS OFFSET OF ACT

MOV     BX,[BX+SI]      ; CSPEC OFFSET IN SORTED TABLE

;   PROCESS ONE CELL SPEC

MOV     DI,[BX+CSPEC_XBYTEOFFS]
                AND     DI, 10FFH       ; WE ONLY WANT BYTE IN LOW
                                        ; HALF OF DI REG
                MOV     SI,[BX+CSPEC_PTROFFS]
                SUB     CX,CX
```

```
                    MOV     CL,[BX+CSPEC_WIDTH]
                    SUB     DX,DX           ; CLEAR SAVE REGISTER
ONE_CELL:           SUB     AX,AX           ; CLEAR WORK REGISTER
                    MOV     AH,CS:[SI]      ; READ A BYTE OF FONT MEM
                                            ; FROM CODE SEGMENT
                    PUSH    CX
                    MOV     CL,[BX+CSPEC_BITOFFST]
                    SHR     AX,CL           ; ALIGN WITH SCANLINE
                                            ; BIT OFFSET
                    POP     CX              ; RESTORE WIDTH LOOP CTR
                    OR      AH,DH           ; OR IN SAVED BITS FROM
                                            ; PREVIOUS BYTE
                    MOV     BP, OFFSET BUFF
                    OR      DS:[BP+DI],AH   ; OR DATA INTO SCANLINE
                    MOV     DH,AL           ; SAVE BITS SHIFTED OUT
                    DEC     DI              ; DEC SCANLINE BYTE INDEX
                    DEC     SI              ; DEC FONT MEM INDEX
                    LOOP    ONE_CELL
;           NOW IF DH NOT ZERO THEN THERE WAS DATA SHIFTED OUT OF AX WHICH MUST
;           ALSO BE ORED INTO THE SCANLINE. THE BYTE OFFSET IN DI HAS BEEN DECREMENTED
;           SO JUST OR IN DH RATHER THAN AH

OR      DS:[BP+DI],DH

MOV     [BX+CSPEC_MEMOFFS],SI
                                            ; UPDATE FONT MEM OFFSET
                    DEC     BYTE PTR [BX+CSPEC_HEIGHT]
                    JNZ     GETNXTCSPC
                    MOV     AX,THIS_ENT
                    CALL    REMOVE_FROM_ACT
GETNXTCSPC:         CMP     NEXT_ENT, 0FFFFH
                    JNE     NEXT_CSPEC

NO_MORE_ACTV:       RET                     ; ALL ACTIVE CELLS PROCESSED
```